United States Patent
Ohtsubo et al.

(10) Patent No.: US 7,802,556 B2
(45) Date of Patent: Sep. 28, 2010

(54) HOMOGENEOUS CHARGE COMPRESSED IGNITION ENGINE OPERATING METHOD

(75) Inventors: Hiroyuki Ohtsubo, Osaka (JP); Tohru Nakazono, Osaka (JP); Takayuki Shirouzu, Osaka (JP)

(73) Assignee: Yanmar Co., Ltd, Osaka-shi (JP)

( * ) Notice: Subject to any disclaimer, the term of this patent is extended or adjusted under 35 U.S.C. 154(b) by 0 days.

(21) Appl. No.: 12/439,075

(22) PCT Filed: Aug. 30, 2007

(86) PCT No.: PCT/JP2007/066887
§ 371 (c)(1),
(2), (4) Date: Feb. 26, 2009

(87) PCT Pub. No.: WO2008/026685
PCT Pub. Date: Mar. 6, 2008

(65) Prior Publication Data
US 2009/0320788 A1  Dec. 31, 2009

(30) Foreign Application Priority Data
Aug. 31, 2006  (JP)  .............................. 2006-234747

(51) Int. Cl.
F02P 5/14  (2006.01)

(52) U.S. Cl. .............................. 123/406.55; 123/406.47; 123/406.48

(58) Field of Classification Search ............ 123/406.44, 123/406.35, 406.52, 406.53, 405.55, 568.11, 123/406.47–406.48
See application file for complete search history.

(56) References Cited

U.S. PATENT DOCUMENTS

| 7,168,420 | B1 * | 1/2007 | Yang | 123/568.15 |
| 7,213,572 | B2 * | 5/2007 | Yang | 123/406.11 |
| 7,234,438 | B2 * | 6/2007 | Yang | 123/295 |
| 7,240,659 | B2 * | 7/2007 | Yang | 123/295 |
| 2001/0052335 | A1 | 12/2001 | Miyakubo et al. | |
| 2002/0046741 | A1 | 4/2002 | Kakuho et al. | |
| 2010/0012079 | A1 * | 1/2010 | Nakazono et al. | 123/295 |

FOREIGN PATENT DOCUMENTS

| JP | 11-6436 A | 1/1999 |
| JP | 2001-355484 A | 12/2001 |

(Continued)

OTHER PUBLICATIONS

International Search Report dated Dec. 11, 2007 w/English translation (five (5) pages).

*Primary Examiner*—Hai H Huynh
(74) *Attorney, Agent, or Firm*—Crowell & Moring LLP

(57) ABSTRACT

A method is provided for operating a homogeneous charge compressed ignition engine in which a mixture gas is burned by compression ignition in a combustion chamber of a cylinder, fuel and air being previously mixed to produce the mixture gas. The homogeneous charge compressed ignition engine includes an ignition plug, which performs spark ignition to the mixture gas. An advance-angle limit and a delay-angle limit of spark ignition timing are set. The compression ignition of the mixture gas is able to be induced at the spark ignition timing. The spark ignition is supplementarily performed to the mixture gas according to an operating condition between the advance-angle limit and the delay-angle limit.

28 Claims, 28 Drawing Sheets

FOREIGN PATENT DOCUMENTS

| | | |
|---|---|---|
| JP | 2002-129991 A | 5/2002 |
| JP | 2002-195040 A | 7/2002 |
| JP | 2002-322927 A | 11/2002 |
| JP | 2003-49650 A | 2/2003 |
| JP | 2003-97317 A | 4/2003 |
| JP | 2003-193872 A | 7/2003 |
| JP | 2004-190539 A | 7/2004 |
| JP | 2005-69097 A | 3/2005 |
| JP | 2006-2637 A | 1/2006 |
| JP | 2006-52680 A | 2/2006 |
| JP | 2006-52684 A | 2/2006 |
| JP | 2006-90169 A | 4/2006 |
| JP | 2006-90170 A | 4/2006 |
| JP | 2006-90171 A | 4/2006 |

\* cited by examiner

HOMOGENEOUS CHARGE COMPRESSED IGNITION ENGINE OPERATING METHOD

TECHNICAL FIELD

The present invention relates to a homogeneous charge compressed ignition (HCCI) engine operating method.

BACKGROUND ART

In this kind of engine, for example, Patent Document 1 discloses a homogeneous charge compressed ignition engine, wherein a mixture gas in which, fuel and air are previously mixed is supplied to a combustion chamber in a cylinder to compress the mixture gas, thereby self-igniting the mixture gas.

The homogeneous charge compressed ignition engine has an advantage that thermal efficiency is high because operation can be performed at a compression ratio higher than that of a spark ignition type engine. Generation of NOx can also be restrained because a combustion temperature can be lowered. However, in the homogeneous charge compressed ignition engine, because the mixture gas is naturally ignited, it is extremely difficult to control ignition timing. The compression ignition can properly be performed only in an extremely narrow operating range because of a relationship between a torque (load) and an intake air temperature.

In the case of the homogeneous charge compressed ignition engine having a plurality of cylinders, cylinders differ from one another in a heat receiving property and a heat radiation property due to arrangement of each cylinder, whereby a difference in in-cylinder temperature is generated at compression ends of the cylinders. Generally, self-ignition timing is advanced when the in-cylinder temperature is higher at the compression end, and the self-ignition timing is delayed when the in-cylinder temperature is lower at the compression end. Therefore, a fluctuation in self-ignition timing is easily generated among the cylinders. The fluctuation in self-ignition among the cylinders lowers cycle efficiency and thermal efficiency and causes an increase in emission amount of an air-pollution substance, such as an unburned hydrocarbon, a carbon monoxide, and NOx, which is contained in an exhaust gas.

Patent Document 1: Japanese Patent Publication Laid-Open No. 2005-69097

DISCLOSURE OF INVENTION

Problems to be Solved by the Invention

In view of the foregoing, an object of the invention is to realize stable ignition in which compression ignition is induced using spark ignition to enlarge an operating range where a compression ignition operation can be performed, even in an operating condition in which the compression ignition is hardly performed. Another object of the invention is to be able to enhance the cycle efficiency and the thermal efficiency and to restrain the air-pollution substance emission by properly adjusting compression ignition timing in the cylinder.

Means for Solving the Problems

The present invention is a homogeneous charge compressed ignition engine operating method in which a mixture gas is burned by compression ignition in a combustion chamber of a cylinder, fuel and air being previously mixed to produce the mixture gas, wherein the homogeneous charge compressed ignition engine includes a spark ignition device which performs spark ignition to the mixture gas, an advance-angle limit and a delay-angle limit of spark ignition timing are set, the compression ignition of the mixture gas being able to be induced at the spark ignition timing, and the spark ignition is supplementarily performed to the mixture gas according to an operating condition between the advance-angle limit and the delay-angle limit.

Preferably the invention has the following configurations.

(1) The engine includes a plurality of cylinders, and the spark ignition is performed in a predetermined cylinder such that the compression ignition is timed in each cylinder.

(2) A time the spark ignition is performed is adjusted such that the compression ignition timing of the mixture gas is adjusted.

(3) The engine includes a plurality of cylinders, and a time the spark ignition is performed is adjusted in each cylinder such that the compression ignition is timed in each cylinder.

(4) Compression ignition timing which becomes a target is set to compare the target compression ignition timing and actual compression ignition timing, and the spark ignition is performed based on the comparison such that the actual compression ignition timing is matched with the target compression ignition timing. The configuration (1) may include the configuration (4).

(5) In the configuration (2) or the configuration (3), compression ignition timing which becomes a target is set to compare the target compression ignition timing and actual compression ignition timing, and a time the spark ignition is performed is adjusted based on the comparison such that the actual compression ignition timing is matched with the target compression ignition timing.

(6) In the configuration (2), compression ignition timing which becomes a target is set to compare the target compression ignition timing and actual compression ignition timing, a time the spark ignition is performed is adjusted between the advance-angle limit and the delay-angle limit based on the comparison such that the actual compression ignition timing is matched with the target compression ignition timing, and an intake air temperature of the mixture gas is adjusted within a range where the actual compression ignition timing can be matched with the target compression ignition timing.

(7) In the configuration (3), compression ignition timing which becomes a target is set in each cylinder to compare the target compression ignition timing and actual compression ignition timing, a time the spark ignition is performed is adjusted in each cylinder between the advance-angle limit and the delay-angle limit based on the comparison such that the actual compression ignition timing is matched with the target compression ignition timing, and an intake air temperature of the mixture gas is adjusted within a range where the actual compression ignition timing can be matched with the target compression ignition timing in all the cylinders.

(8) In the configuration (2), compression ignition timing which becomes a target is set, optimum spark ignition timing is set in the pieces of spark ignition timing which achieve the target compression ignition timing, the target compression ignition timing and the actual compression ignition timing are compared, a time the spark ignition is performed is adjusted based on the comparison such that the actual compression ignition timing is matched with the target compression ignition timing, and an intake air temperature is adjusted such that the spark ignition timing is matched with the optimum spark ignition timing.

(9) In the configuration (3), compression ignition timing which becomes a target is set in each cylinder, optimum spark ignition timing is set in the pieces of spark ignition timing which achieve the target compression ignition timing in each cylinder, the target compression ignition timing and the actual compression ignition timing are compared in each cylinder, a time the spark ignition is performed is adjusted in each cylinder based on the comparison such that the actual compression ignition timing is matched with the target compression ignition timing, and an intake air temperature is adjusted such that the spark ignition is performed with at the optimum spark ignition timing to the cylinder having the latest spark ignition timing.

(10) In the configuration (7), an amount of fuel supplied to the cylinder in which the spark ignition timing becomes the advance-angle limit is increased relative to other cylinders, and an amount of fuel supplied to the cylinder in which the spark ignition timing becomes the delay-angle limit is decreased relative to other cylinders.

(11) In the configuration (7), an effective compression ratio of the cylinder in which the spark ignition timing becomes the advance-angle limit is increased relative to other cylinders, and an effective compression ratio of the cylinder in which the spark ignition timing becomes the delay-angle limit is decreased relative to other cylinders.

(12) In the configuration (7), the engine includes EGR means for refluxing the exhaust gas into the cylinder, an EGR amount for the cylinder in which the spark ignition timing becomes the advance-angle limit is increased relative to other cylinders, and an EGR amount for the cylinder in which the spark ignition timing becomes the delay-angle limit is decreased or eliminated relative to other cylinders.

(13) In the configuration (7), an intake air temperature in the cylinder in which the spark ignition timing becomes the advance-angle limit is increased relative to other cylinders, and an intake air temperature in the cylinder in which the spark ignition timing becomes the delay-angle limit is decreased relative to other cylinders.

(14) In the configuration (7), a temperature of the cylinder in which the spark ignition timing becomes the advance-angle limit is increased relative to other cylinders, and a temperature of the cylinder in which the spark ignition timing becomes the delay-angle limit is decreased relative to other cylinders.

(15) In the configuration (7), a component of the cylinder in which the spark ignition timing becomes the advance-angle limit is made of a material having a heat conductivity lower than those of other cylinders, and a component of the cylinder in which the spark ignition timing becomes the delay-angle limit is made of a material having a heat conductivity higher than those of other cylinders.

(16) In the configuration (3), compression ignition timing which becomes a target is set in each cylinder to compare the target compression ignition timing and the actual compression ignition timing, a time the spark ignition is performed is adjusted in each cylinder based on the comparison such that the actual compression ignition timing is matched with the target compression ignition timing, and an intake air temperature is adjusted such that a normal operation is performed in the cylinder having the latest spark ignition timing.

(17) An air excess ratio of the mixture gas is detected, and the advance-angle limit is changed according to the air excess ratio.

(18) The engine includes a plurality of cylinders, an air excess ratio of the mixture gas is detected in each cylinder, and the advance-angle limit is changed in each cylinder according to each air excess ratio.

(19) An intake air temperature of the mixture gas is detected, and the advance-angle limit is changed according to the intake air temperature. The configuration (17) or the configuration (18) may include the configuration (19).

(20) The engine includes a plurality of cylinders, an intake air temperature of the mixture gas is detected in each cylinder, and the advance-angle limit is changed in each cylinder according to each intake air temperature. The configuration (17) or the configuration (18) may include the configuration (20).

Effects of the Invention

According to the invention, in the condition that the compression ignition is hardly performed due to the low in-cylinder temperature, the spark ignition is supplementarily performed to induce the compression ignition, so that the compression ignition can securely be performed to prevent the misfire. Accordingly, the compression ignition operation can be performed while the compression ignition is expanded to an operation range where the compression ignition operation cannot be performed in the conventional technique, and the engine power can be increased. The advance-angle limit and the delay-angle limit are set in the spark ignition in which the compression ignition can be induced, and the spark ignition is performed between the advance-angle limit and the delay-angle limit, so that the compression ignition can securely be performed.

Accordingly, in the configuration (1), in the plural-cylinder engine, the spark ignition is supplementarily performed to the predetermined cylinder in which the compression ignition timing is delayed due to the low in-cylinder temperature, thereby inducing the compression ignition of the cylinder. Therefore, the fluctuation in compression ignition timing is prevented between the cylinder and another cylinder having early compression ignition timing, so that the improvements of the cycle efficiency and thermal efficiency can be achieved.

Accordingly, in the configuration (2), the high thermal efficiency can be obtained by adjusting the spark ignition timing, or the compression ignition can be performed at proper ignition timing, in which the emission of the air-pollution substance contained in the exhaust gas is restrained, by adjusting the spark ignition timing.

Accordingly, in the configuration (3), the fluctuation in compression ignition timing among the cylinders of the plural-cylinder engine can be prevented by adjusting the time spark ignition is performed in each cylinder. Therefore, the improvements of the cycle efficiency and thermal efficiency can be achieved. The higher thermal efficiency can be obtained by adjusting the spark ignition timing of each cylinder, or the compression ignition can be performed at proper ignition timing, in which the emission of the air-pollution substance contained in the exhaust gas is restrained, by adjusting the spark ignition timing of each cylinder.

Accordingly, in the configuration (4), based on whether or not the spark ignition is performed, the compression ignition timing to be adjusted such that the actual compression ignition timing is matched with the target compression ignition timing. Therefore, the improvement of the engine performance or the restraint of the air-pollution substance emission can be achieved when the target compression ignition timing is set at the ignition timing in which the high thermal efficiency can be obtained or the air-pollution substance emission can be restrained.

Accordingly, in the configuration (5), the spark ignition timing is adjusted, which allows the compression ignition timing to be adjusted such that the actual compression ignition timing is matched with the target compression ignition timing. Therefore, the improvement of the engine performance or the restraint of the air-pollution substance emission can be achieved when the target compression ignition timing is set at the ignition timing in which the high thermal efficiency can be obtained or the air-pollution substance emission can be restrained.

Accordingly, in the configuration (6), the effect similar to that of the configuration (5) is obtained. Depending on the intake air temperature condition, sometimes the actual compression ignition timing cannot be matched with the target compression ignition timing even if the spark ignition is performed between the advance-angle limit and the delay-angle limit in each cylinder. In such cases, when the intake air temperature is properly adjusted, the actual compression ignition timing can securely be matched with the target compression ignition timing in all the cylinders of the plural-cylinder engine by the spark ignition performed at limited timing.

Accordingly, in the configuration (7), the effect similar to that of the configuration (5) is obtained. Depending on the intake air temperature condition, sometimes the actual compression ignition timing cannot be matched with the target compression ignition timing even if the spark ignition is performed between the advance-angle limit and the delay-angle limit in each cylinder. In such cases, the actual compression ignition timing can be matched with the target compression ignition timing in all the cylinders of the plural-cylinder engine by properly adjusting the intake air temperature.

Accordingly, in the configuration (8), the effect similar to that of the configuration (5) is obtained. The spark ignition can be performed at the optimum timing such as the timing of the improvement of the engine performance or the timing of the restraint of the air-pollution substance emission by adjusting the intake air temperature.

Accordingly, in the configuration (9), the effect similar to that of the configuration (5) is obtained. The spark ignition can be performed at the optimum timing such as the timing of the improvement of the engine performance or the timing of the restraint of the air-pollution substance emission by adjusting the intake air temperature.

In the configuration (10) to the configuration (15), various means are additionally performed to enable the compression ignition timing to be adjusted in the case where the compression ignition timing (spark ignition timing) cannot properly be adjusted even if the means of the configuration (7) is adopted.

Accordingly, in the configuration (10), the fuel supply amount is relatively increased to easily perform the compression ignition for the cylinder in which the spark ignition timing becomes the advance-angle limit (cylinder in which the compression ignition is hardly performed), so that the spark ignition timing can be delayed. On the other hand, the fuel supply amount is relatively decreased to hardly perform the compression ignition for the cylinder in which the spark ignition timing becomes the delay-angle limit (cylinder in which the compression ignition is easily performed), so that the spark ignition timing can be advanced.

Accordingly, in the configuration (11), the effective compression ratio is relatively increased to easily perform the compression ignition for the cylinder in which the spark ignition timing becomes the advance-angle limit, so that the spark ignition timing can be delayed. On the other hand, the effective compression ratio is relatively decreased to hardly perform the compression ignition for the cylinder in which the spark ignition timing becomes the delay-angle limit, so that the spark ignition timing can be advanced.

Accordingly, in the configuration (12), the EGR amount is relatively increased to raise the mixture gas temperature for the cylinder in which the spark ignition timing becomes the advance-angle limit, and the compression ignition is easily performed, so that the spark ignition timing can be delayed. On the other hand, the EGR amount is relatively decreased (or eliminated) to lower the mixture gas temperature for the cylinder in which the spark ignition timing becomes the delay-angle limit, and the compression ignition is hardly performed, so that the spark ignition timing can be advanced.

Accordingly, in the configuration (13), the intake air temperature is relatively increased to easily perform the compression ignition for the cylinder in which the spark ignition timing becomes the advance-angle limit, so that the spark ignition timing can be delayed. On the other hand, the intake air temperature is relatively decreased to hardly perform the compression ignition for the cylinder in which the spark ignition timing becomes the delay-angle limit (cylinder in which the compression ignition is easily performed), so that the spark ignition timing can be advanced.

Accordingly, in the configuration (14), the cylinder temperature is relatively increased to easily perform the compression ignition for the cylinder in which the spark ignition timing becomes the advance-angle limit, so that the spark ignition timing can be delayed. On the other hand, the cylinder temperature is relatively decreased to hardly perform the compression ignition for the cylinder in which the spark ignition timing becomes the delay-angle limit, so that the spark ignition timing can be advanced.

Accordingly, in the configuration (15), the heat radiation property of the cylinder component is relatively lowered to easily perform the compression ignition for the cylinder in which the spark ignition timing becomes the advance-angle limit, so that the spark ignition timing can be delayed from the advance-angle limit. On the other hand, the heat radiation property of the cylinder component is relatively enhanced to hardly perform the compression ignition for the cylinder in which the spark ignition timing becomes the delay-angle limit, so that the spark ignition timing can be advanced.

In the configuration (16), means is further performed in the case where the compression ignition timing (spark ignition timing) cannot properly be adjusted even if the means of the configuration (10) to the configuration (15) are performed. Accordingly, in the configuration (16), because the normal operation is performed in the cylinder having the latest spark ignition timing, the knocking is not generated even if the misfire is generated in the cylinders including other cylinders. Therefore, engine damage caused by the knocking can securely be prevented.

Accordingly, in the configuration (17), the advance-angle limit can properly be set according to the air excess ratio of the mixture gas.

Accordingly, in the configuration (18), the advance-angle limit can properly be set in each cylinder according to the air excess ratio of the mixture gas.

Accordingly, in the configuration (19), the advance-angle limit can properly be set according to the intake air temperature of the mixture gas.

Accordingly, in the configuration (20), the advance-angle limit can properly be set in each cylinder according to the intake air temperature of the mixture gas.

EXPLANATION OF LETTERS OR NUMERALS

11 Homogeneous charge compressed ignition engine
13 Cylinder
14 Piston
35 Temperature controller
45 Controller
57 Fuel regulating valve
61 Heater
63 External EGR means

BEST MODE FOR CARRYING OUT THE INVENTION

[Outline of Homogeneous Charge Compressed Ignition Engine]

Figure 1:
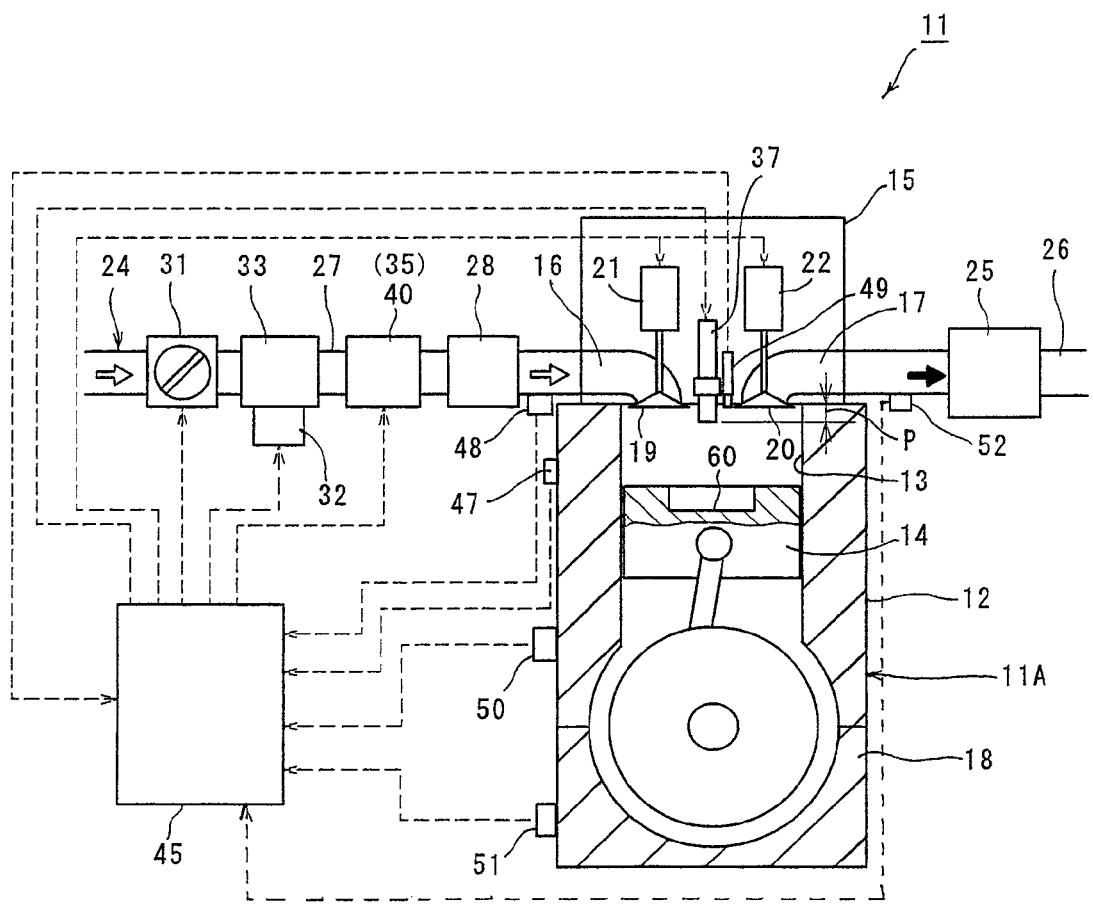
FIG. 1 is a sectional view schematically showing a homogeneous charge compressed ignition engine 11 according to an embodiment of the invention.
Figure 2:
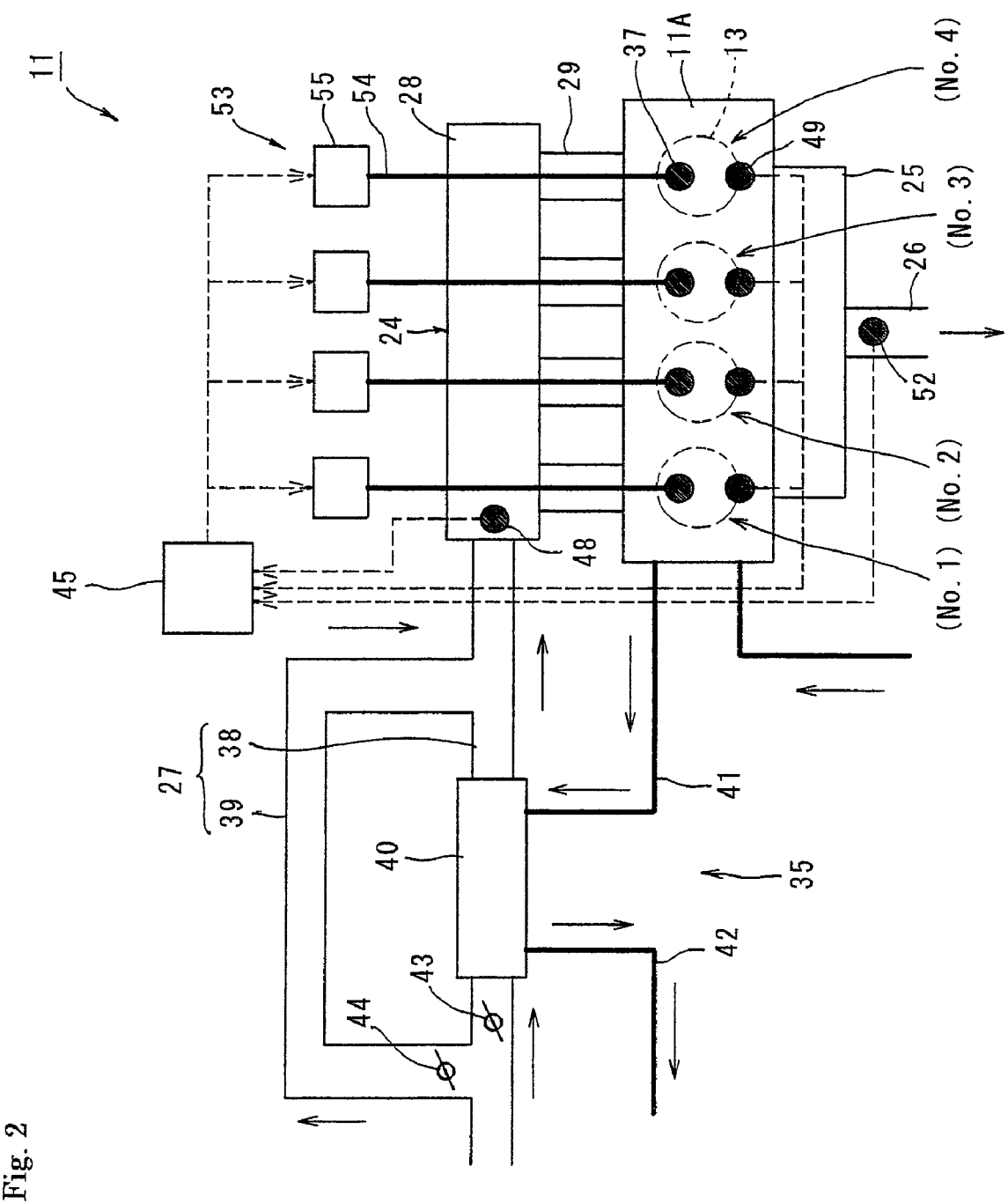
FIG. 2 is a plan view schematically showing the homogeneous charge compressed ignition engine.

FIG. 1 is a sectional view schematically showing a homogeneous charge compressed ignition engine 11 according to an embodiment of the invention, and FIG. 2 is a plan view schematically showing the homogeneous charge compressed ignition engine 11. The homogeneous charge compressed ignition engine 11 of the embodiment is a four-cylinder (No. 1 to No. 4) four-cycle engine, and the homogeneous charge compressed ignition engine 11 has an engine body 11A including a cylinder block 12, a cylinder head 15, and a crankcase 18. A plurality of (four) cylinders 13 are provided in the cylinder block 12, and a piston 14 is slidably fitted in each cylinder 13. An intake port 16 and an exhaust port 17 are provided in the cylinder head 15. The intake port 16 and the exhaust port 17 are opened and closed by an intake valve 19 and an exhaust valve 20, respectively. The intake valve 19 and the exhaust valve 20 are driven by valve mechanisms 21 and 22.

An intake pipe 24 is connected to the intake port 16, and an exhaust pipe 26 including an exhaust manifold 25 is connected to the exhaust port 17. As shown in FIG. 2, the intake pipe 24 includes a main intake pipe 27, an intake surge tank 28 connected to the main intake pipe 27, and a plurality of branched intake pipes 29 each of which is connected to the cylinder 13 from the intake surge tank 28.

As shown in FIG. 1, a throttle valve 31, a mixer 33, and a heating device (temperature controller) 35 are provided in the main intake pipe 27. A flow rate of air introduced into the main intake pipe 27 is adjusted by the throttle valve 31, and a mixer 33 mixes the air and the fuel supplied through a fuel control valve (A/F valve) 32. A ratio of the fuel and the air, that is, an air excess ratio is set in the fuel control valve 32.

The heating device 35 heats the mixture gas of the air and the fuel, the mixture gas flows into the intake surge tank 28, and the mixture gas is taken in a combustion chamber of each cylinder 13 from each branched intake pipe 29 through the intake port 16 (intake stroke). The mixture gas supplied into the combustion chamber in the intake stroke is compressed in a compression stroke, and the mixture gas is self-ignited when the piston 14 reaches a neighborhood of a top dead center, thereby pressing down the piston (expansion stroke). The combustion gas is emitted from the exhaust port 17 through the exhaust pipe 26 in an exhaust stroke.

As shown in FIG. 2, the heating device 35 includes a heat exchanger 40 which is provided in a route 38. The route 38 is one of the main intake pipes 27 divided into two routes. In the heat exchanger 40, engine cooling water is used as a heat exchange medium. In the heat exchanger 40, the cooling water circulating the cylinder block 12 and the cylinder head 15 (FIG. 1) is supplied to the heat exchanger 40 through a channel 41, and the cooling water is returned to a cooler (not shown) through a channel 42. Metering valves 43 and 44 are provided in the routes 38 and 39 of the main intake pipe 27, respectively.

The heat exchanger 40 is not provided in the route 39 of the main intake pipe 27, but the mixture gas passed through the route 39 is directly introduced to the intake surge tank 28 while the mixture gas is not heated. The metering valves 43 and 44 controls (including stop) a flow of the mixture gas into the routes 38 and 39 of the main intake pipe 27. For example, only the metering valve 43 is opened to pass the mixture gas through the route 38, which allow the mixture gas to be rapidly heated. For example, only the metering valve 44 is opened to pass the mixture gas through the route 39, which allow the mixture gas not to be heated (relatively cooled). The metering valves 43 and 44 are opened to mix the heated mixture gas and the unheated mixture gas, which allows the temperature to be finely controlled.

Engine oil and exhaust gas can be used as a heat exchange medium of the heating device 35. An electric heater can be used as the heating device 35. The main intake pipe 27 is not branched as described above, but the heating device 35 can be provided into one route.

As shown in FIG. 1, the engine 11 includes a controller 45. The controller 45 controls the throttle valve 31, the fuel control valve 32, the heating device 35, and the like. A cooling water temperature sensor 47, an intake air temperature sensor 48, an in-cylinder pressure sensor 49, an engine speed sensor 50, a torque sensor 51, an air excess ratio sensor 52, and the like are provided in the engine 11. Detection signals of various sensors are fed into the controller 45.

An ignition plug 37 is provided in the cylinder head 15 of the engine 11. As shown in FIG. 2, the ignition plug 37 is connected to an ignition coil 55 through high-tension cord 54, and the ignition plug 37, the high-tension cord 54, and the ignition coil 55 constitute a spark ignition device 53. The controller 45 controls energization of the ignition coil 55 of the spark ignition device 53.

[Homogeneous Charge Compressed Ignition Engine Operating Method]

Originally, in the homogeneous charge compressed ignition engine 11, the operation is performed by compression ignition of the mixture gas with no use of spark ignition. However, in the homogeneous charge compressed ignition engine 11 of the invention, the spark ignition device 53 is supplementarily used in order to mainly induce the compression ignition.

That is, in the homogeneous charge compressed ignition engine 11 of the embodiment, the compression ignition is induced by performing the spark ignition, which enables the compression ignition operation to be performed even in an operating condition in which the compression ignition is hardly performed. The compression ignition timing is adjusted by adjusting the spark ignition timing, whereby the optimum engine performance can be obtained or the emission of the air-pollution substance contained in the exhaust gas can be restrained.

Not only the spark ignition device 53 is used to induce the compression ignition, but also the spark ignition device 53 is used to perform the spark ignition operation (SI operation) in starting up the engine 11.

(Operating Method 1)

Figure 3:
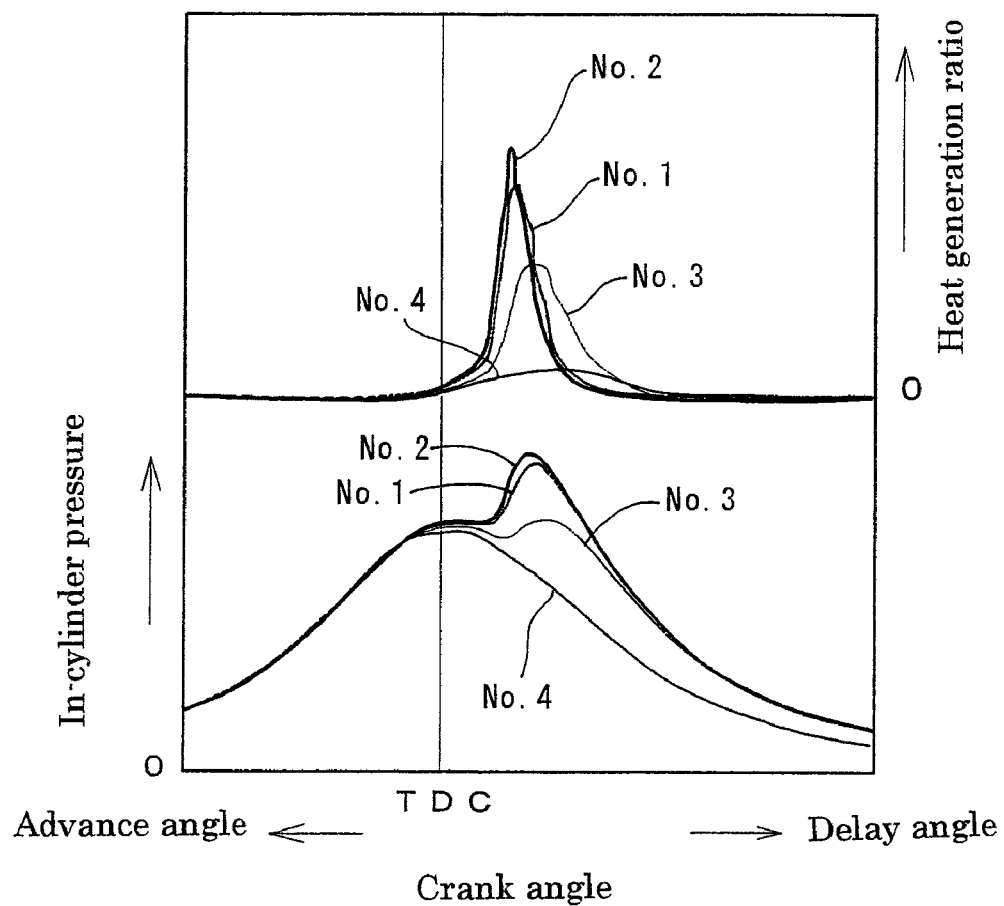
FIG. 3 is a graph showing changes in in-cylinder pressure and heat generation rate in each cylinder in a certain operating condition.

FIG. 3 is a graph showing changes in in-cylinder pressure (left vertical axis and lower-side diagram) and heat generation rate (right vertical axis and upper-side diagram) in each cylinder in a certain operating condition. Referring to FIG. 3, in first to third cylinders (No. 1 to No. 3), the in-cylinder pressure and the heat generation rate largely rise to reach peaks when a crank angle passes through TDC. On the other hand, in a fourth cylinder (No. 4), the in-cylinder pressure becomes the peak when the crank angle reaches TDC, and the heat generation rate is slightly increased after that. Accordingly, in the fourth cylinder (No. 4), it is believed that the compression ignition is not substantially performed (misfire is generated). In the first to third cylinders, although it is believed that the compression ignition is performed, a fluctuation in compression ignition timing is generated. The reason why the fluctuation in ignition timing is generated among the cylinders is that the cylinders differ from one another in a temperature at a compression end by the differences in heat receiving property and heat radiation property caused by the cylinder arrangement.

In the embodiment, for the operating method 1, the spark ignition device 53 (FIG. 2) performs the spark ignition to the cylinder (No. 4) in which the compression ignition is not performed. When the spark ignition is performed, the self-ignition of the mixture gas in the compressed state is started by the spark of the spark ignition device 53 or propagation fire after the ignition. That is, the compression ignition is induced by the spark ignition. Therefore, the compression ignition is surely performed even in the cylinder in which the compression ignition is hardly performed, which allows the compression ignition operation to be performed in all the cylinders. Accordingly, engine power can be increased.

In the embodiment, the operation in which the spark ignition is supplementarily used to induce the compression ignition is referred to as compression ignition operation (HCCI operation) induced by fire propagation combustion.

Figure 4:
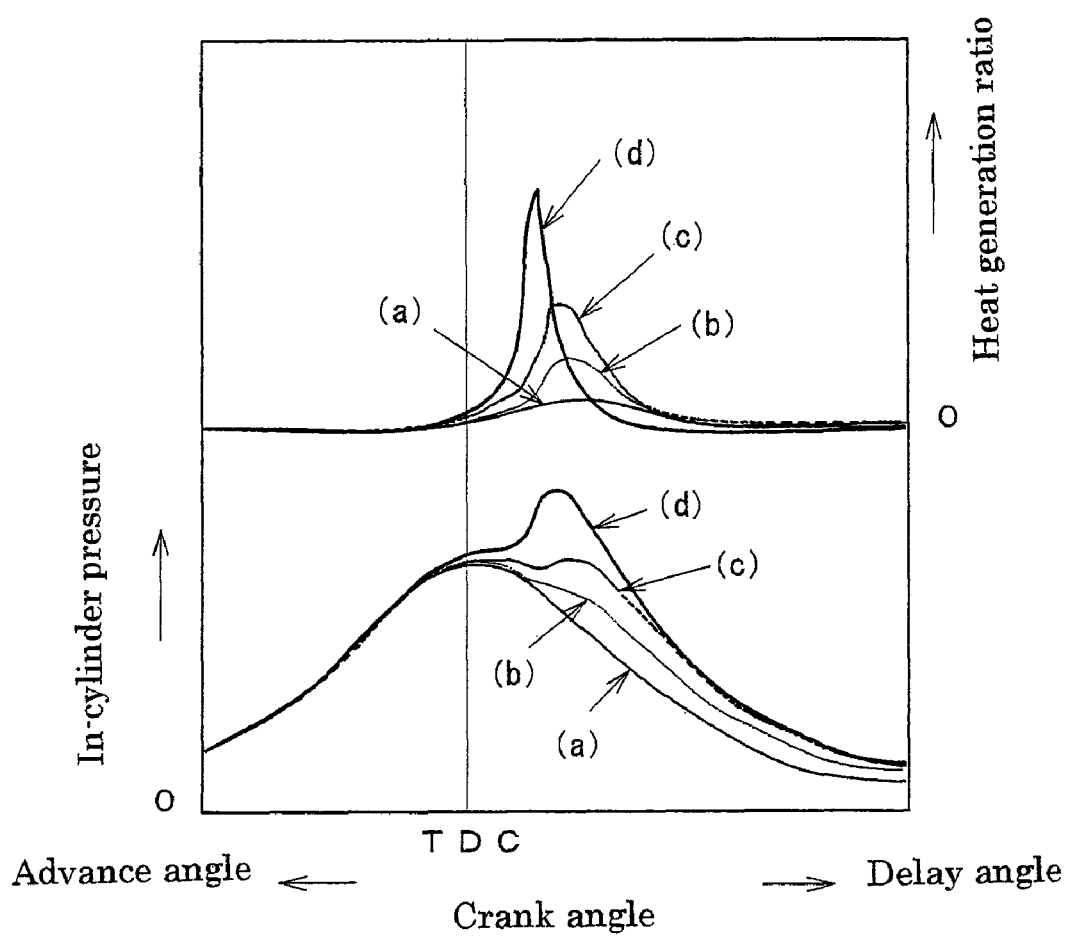
FIG. 4 is a graph showing the changes in in-cylinder pressure and heat generation rate in the case where spark ignition is not performed and in the case where timing is changed to perform the spark ignition for the cylinder in which compression ignition is not generated.
Figure 5:
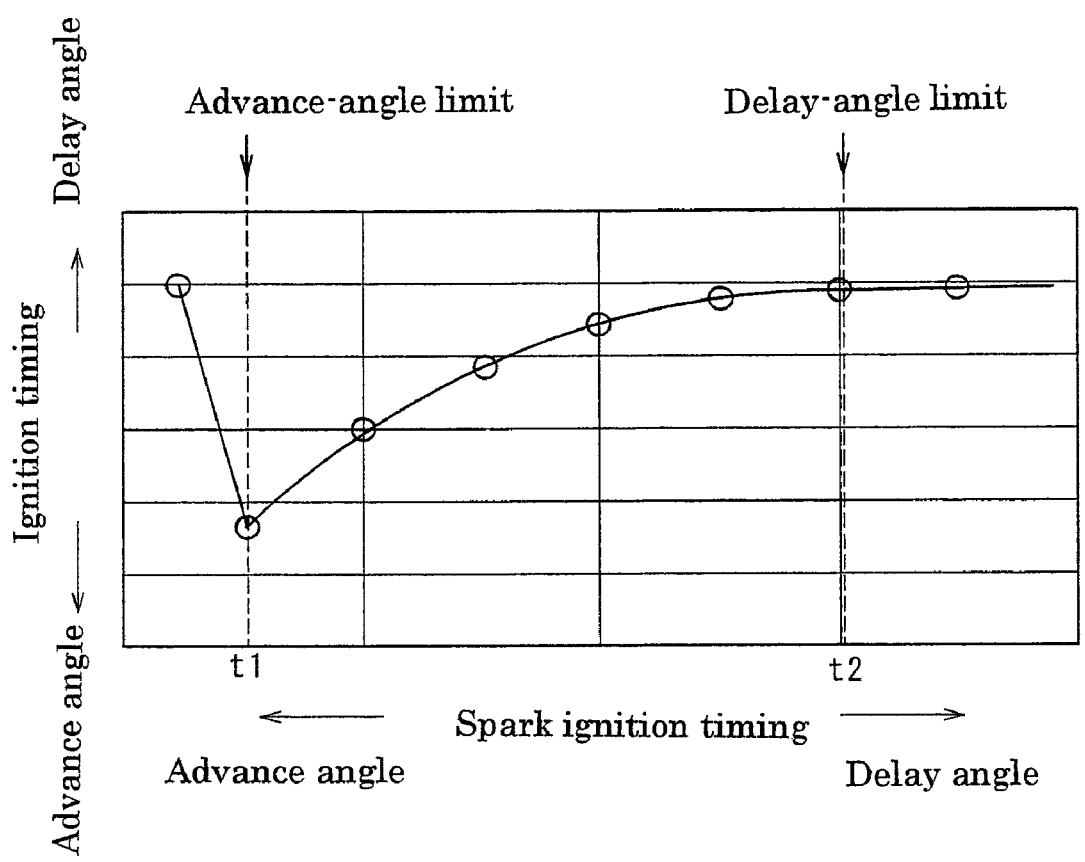
FIG. 5 is a graph showing a relationship between spark ignition timing and compression ignition timing.

FIG. 4 is a graph showing the changes in in-cylinder pressure and heat generation rate in the case where spark ignition is not performed and in the case where timing is changed to perform the spark ignition for the cylinder (fourth cylinder (No. 4) in FIG. 3) in which the compression ignition is not generated. In the case (a), the spark ignition is not performed. In the cases 4(b) to 4(d), the spark ignition is performed and the spark ignition timing is gradually advanced in the order of (b) to (d). FIG. 5 is a graph showing a relationship between spark ignition timing and compression ignition timing.

As shown in FIGS. 4 and 5, as the spark ignition timing is delayed from an advance-angle side toward a delay-angle side, the compression ignition timing is also delayed from the advance-angle side toward the delay-angle side.

As can be seen from FIG. 5, when the spark ignition timing is located on the advance-angle side from certain timing t1, the compression ignition timing is not substantially advanced even if the spark ignition timing is further advanced. On the contrary, when the spark ignition timing is located on the delay-angle side from certain timing t2, the compression ignition timing is not substantially delayed even if the spark ignition timing is further delayed. This is attributed to the fact that the compression ignition is already naturally started.

Accordingly, in the invention, attention focuses on the above-described characteristics, the timing t1 is set at limit timing (advance-angle limit) on the advance-angle side of the spark ignition while the timing t2 is set at limit timing (delay-angle limit) on the delay-angle side, and the operation of the spark ignition device is controlled such that the spark ignition is performed between the limit timing t1 and the limit timing t2. Therefore, the compression ignition can surely be induced by performing the spark ignition.

In the embodiment, time a combustion mass ratio becomes 50% is dealt with as the compression ignition timing. The in-cylinder pressure is detected by the in-cylinder pressure sensor 49 (FIG. 1), and the combustion mass ratio is obtained by analysis based on the detection value.

As shown in FIG. 2, an intake air temperature sensor 48 is provided in the intake pipe 24, and an air excess ratio sensor 52 is provided in the exhaust pipe 26.

Figure 6:
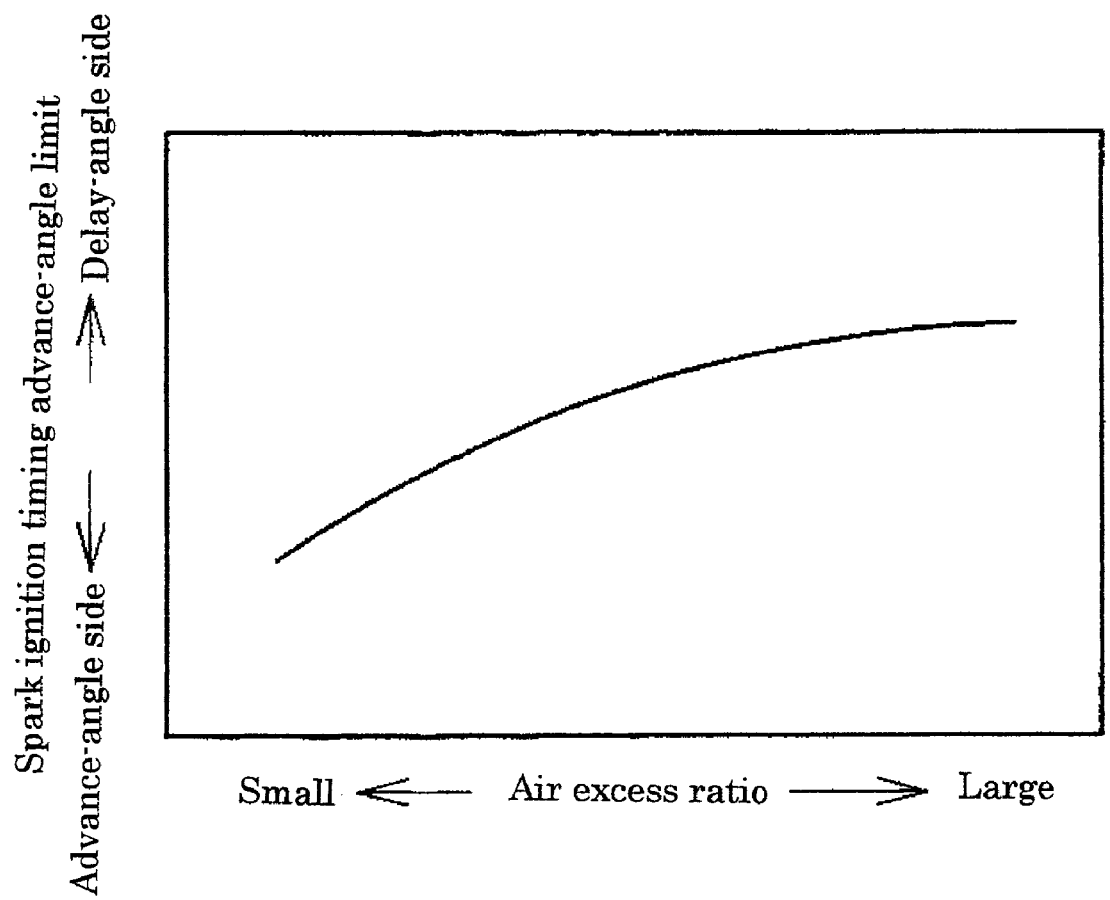
FIG. 6 is a graph showing a change in advance-angle limit of the spark ignition timing to a change in air excess ratio.
Figure 7:
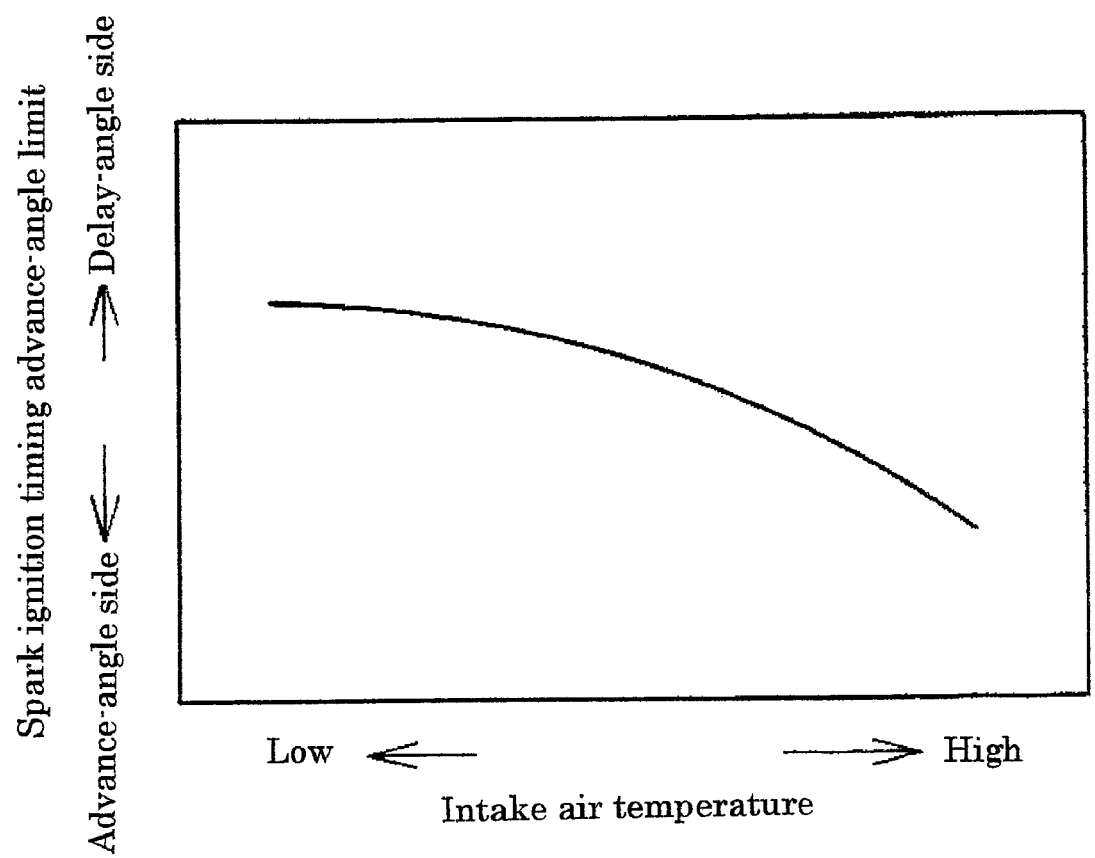
FIG. 7 is a graph showing the change in advance-angle limit of the spark ignition timing to a change in intake air temperature.

FIG. 6 is a graph showing a change in advance-angle limit of the spark ignition timing to a change in air excess ratio. As can be seen from the graph of FIG. 6, the advance-angle limit of the spark ignition timing is changed when the air excess ratio is fluctuated. FIG. 7 is a graph showing the change in advance-angle limit of the spark ignition timing to a change in intake air temperature. As can be seen from the graph of FIG. 7, the advance-angle limit of the spark ignition timing is changed when the intake air temperature is fluctuated.

Figure 8:
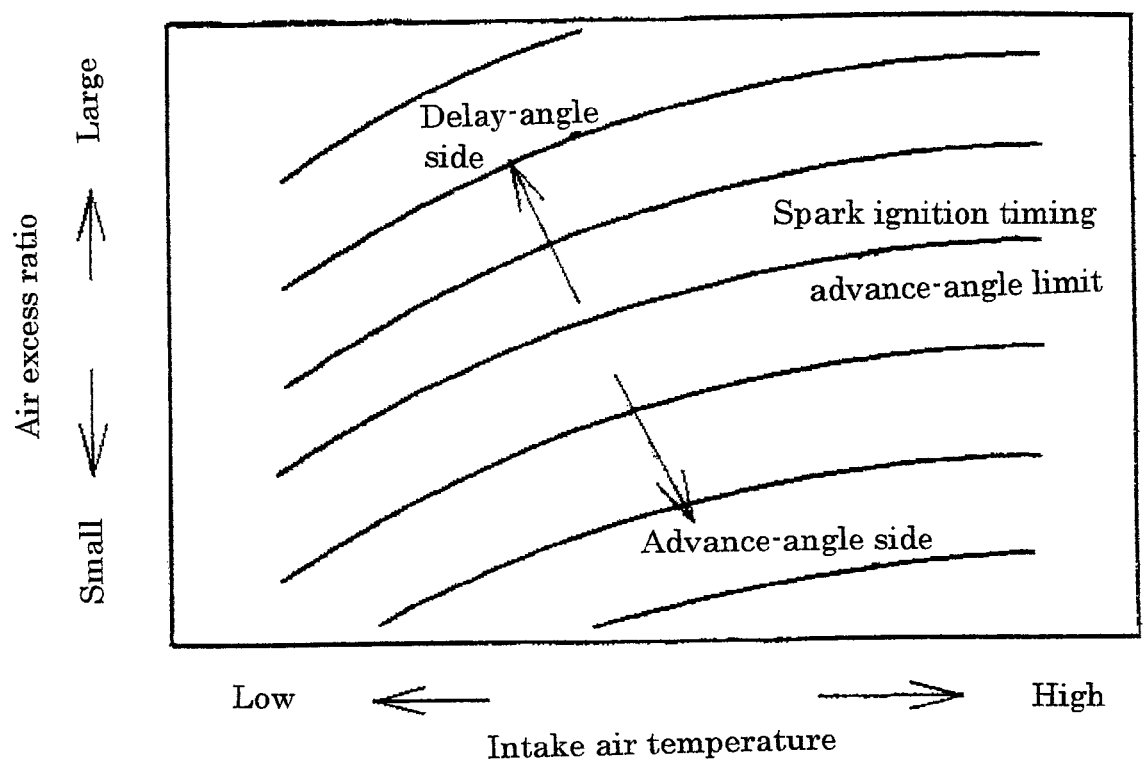
FIG. 8 is a graph showing the change in advance-angle limit of the spark ignition timing to the changes in air excess ratio and intake air temperature.

FIG. 8 is a graph showing the change in advance-angle limit of the spark ignition timing to the changes in air excess ratio and intake air temperature. As can be seen from the graph of FIG. 8, the advance-angle limit of the spark ignition timing is changed when the air excess ratio and the intake air temperature are fluctuated.

Accordingly, in the embodiment, the air excess ratio and/or the intake air temperature is always detected by the air excess ratio senor 52 and/or the intake air temperature sensor 48 shown in FIG. 2, and the advance-angle limit of the spark ignition timing is appropriately changed based on the detection value. Therefore, the limit timing of the advance-angle side is properly set according to the actual operation, and the compression ignition is securely induced by the spark ignition.

In FIG. 2, one intake air temperature sensor 48 and one air excess ratio sensor 52 are provided so as to correspond to all the cylinders (No. 1 to No. 4). Alternatively, the plurality of intake air temperature sensors 48 may be provided so as to individually correspond to the cylinders, or the plurality of air excess ratio sensors 52 may be provided so as to individually correspond to the cylinders. Therefore, the advance-angle limit of the spark ignition timing can properly be changed in each cylinder.

(Application of Operating Method 1 to Single-Cylinder Engine)

In the operating method 1 as described above, the spark ignition is performed to the predetermined cylinder (No. 4) in order to perform the compression ignition in all the cylinders (No. 1 to No. 4) of the plural-cylinder homogeneous charge compressed ignition engine 11. Obviously the operating method 1 can be applied to the single-cylinder homogeneous charge compressed ignition engine.

In the single-cylinder homogeneous charge compressed ignition engine, the spark ignition is performed in the operating condition in which the compression ignition is hardly performed, so that the compression ignition can be induced to securely perform the compression ignition. This enables the engine 11 to be prevented from going into the completely inoperable state.

(Operating Method 2)

The adoption of the operating method 1 can perform the compression ignition for the cylinder in which the compression ignition is hardly performed, and the compression ignition can securely be performed to all the cylinders in the plural-cylinder engine 11. In the following operating method 2, the compression ignition is timed in all the cylinders.

Figure 9:
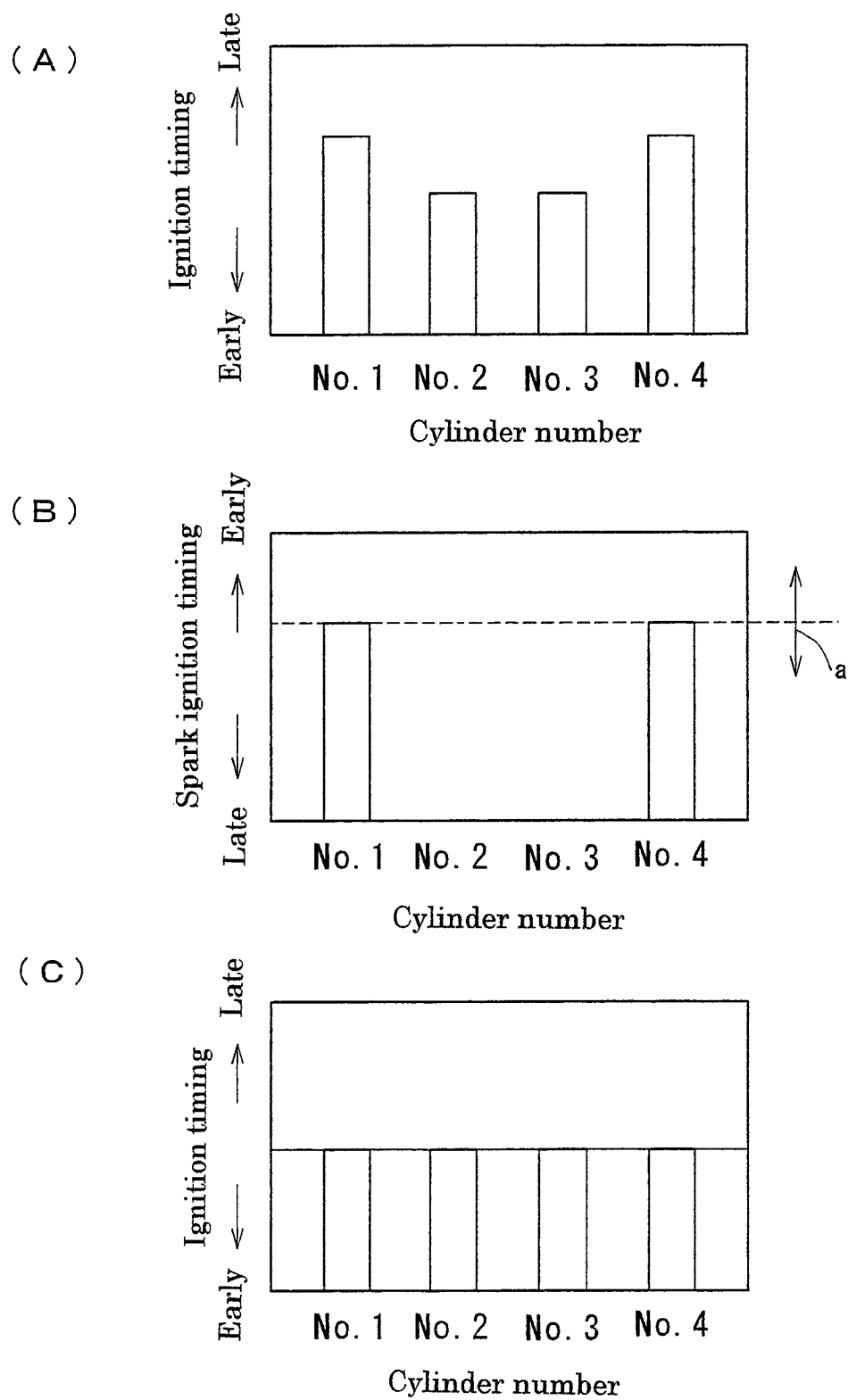
FIG. 9(A) is a graph showing compression ignition timing of each cylinder in the case where the spark ignition is not performed.
FIG. 9(B) is a graph showing the spark ignition timing.
FIG. 9(C) is a graph showing the compression ignition timing in the case where the spark ignition is performed.

FIG. 9(A) is a graph showing the compression ignition timing of each cylinder in a certain operating condition, a horizontal axis indicates a cylinder number, and a vertical axis indicates the ignition timing (compression ignition timing). In the graph of FIG. 9(A), the compression ignition timing is delayed in the first cylinder (No. 1) and the fourth cylinder (No. 4), and the compression ignition timing is advanced in the second cylinder (No. 2) and the third cylinder (No. 3).

In the case of the engine 11 of FIG. 9(A), in the operating method 2, the spark ignition is supplementarily performed in the first and fourth cylinders (No. 1 and No. 4) in which the compression ignition timing is delayed as shown in FIG. 9(B). Therefore, as shown in FIG. 9(C), the compression ignition timing is advanced in the first and fourth cylinders (No. 1 and No. 4), and the compression ignition timing of the first and fourth cylinders (No. 1 and No. 4) can be matched with the compression ignition timing of the second and third cylinders (No. 2 and No. 3). When the compression ignition is timed in the cylinders as described above, the cycle efficiency is enhanced, and therefore the thermal efficiency can be enhanced. Because the ignition stability is improved, a power fluctuation is decreased.

(Operating Method 3)

In the operating method 2, the compression ignition is timed in all the cylinders by simply performing the spark ignition to the cylinder in which the compression ignition timing is delayed. In an operating method 3, the compression ignition is timed in all the cylinders by adjustment.

As shown in FIG. 5, it is found that the compression ignition timing is changed when the spark ignition timing is changed between the advance-angle limit t1 and the delay-angle limit t2. In the operating method 3, in the operating condition of FIG. 9(A), the spark ignition timing is adjusted in the first and fourth cylinders (No. 1 and No. 4) as shown by an arrow a as shown in FIG. 9(B), and the compression ignition timing of the first and fourth cylinders (No. 1 and No. 4) is securely matched with the compression ignition timing of the second and third cylinders (No. 2 and No. 3).

(Operating Method 4)

FIG. 10(A) is a graph showing the compression ignition timing of the cylinders (No. 1 to No. 4) in a certain operating condition, the horizontal axis indicates a cylinder number, and the vertical axis indicates the ignition timing (compression ignition timing). In the graph of FIG. 10(A), the compression ignition timing is delayed in the order of the second cylinder (No. 2)—third cylinder (No. 3)—first cylinder (No. 1)—fourth cylinder (No. 4).

In the case of the operating condition of FIG. 10(A), in an operating method 4, the spark ignition timing is adjusted (arrows b1 to b4) in each cylinder so as to be delayed in the order of the fourth cylinder (No. 4)—first cylinder (No. 1)—third cylinder (No. 3)—second cylinder (No. 2) as shown in FIG. 10(B). As a result, as shown in FIG. 10(C), the compression ignition positions of the cylinders can securely be matched with one another.

(Spark Ignition Timing Adjusting Method in Operating Methods 3 and 4)

The spark ignition timing can be adjusted by any one of the following methods such that the controller 45 controls the energization of the spark ignition device 53 shown in FIG. 2 to the ignition coil 55.

(1) Control with Map

A spark ignition timing map is produced based on a relationship between spark ignition timing and an operating condition such as the intake air temperature and the air excess ratio, and the spark ignition timing map is stored in a memory (not shown) of the controller 45. For example, a balance between thermal efficiency and an emission amount of the air-pollution substance (such as nitrogen oxide (NOx), unburned hydrocarbon (THC), and carbon monoxide (CO)) contained in the exhaust gas can be established at the spark ignition timing, and the spark ignition timing can realize the proper compression ignition timing. Then the spark ignition timing map is referred to select the spark ignition timing corresponding to the detection value while the operating status is detected, and the spark ignition device 53 is controlled such that the spark ignition is performed at the spark ignition timing.

(2) Feedback Control

Target compression ignition timing is previously set. For example, the balance between the thermal efficiency and the emission amount of the air-pollution substance contained in the exhaust gas can be established at the target compression ignition timing. The detected actual compression ignition timing and the target compression ignition timing are compared to each other, and the spark ignition device 53 is controlled to adjust the spark ignition timing based on the comparison such that the actual compression ignition timing is matched with the target compression ignition timing.

For example, NOx which is of the air-pollution substance tends to be increased when the ignition timing is early, and THC or CO tends to be increased when the ignition timing is late, so that the timing in which the emission amount is reduced with a proper balance can be set as the target compression ignition timing.

Figure 11:
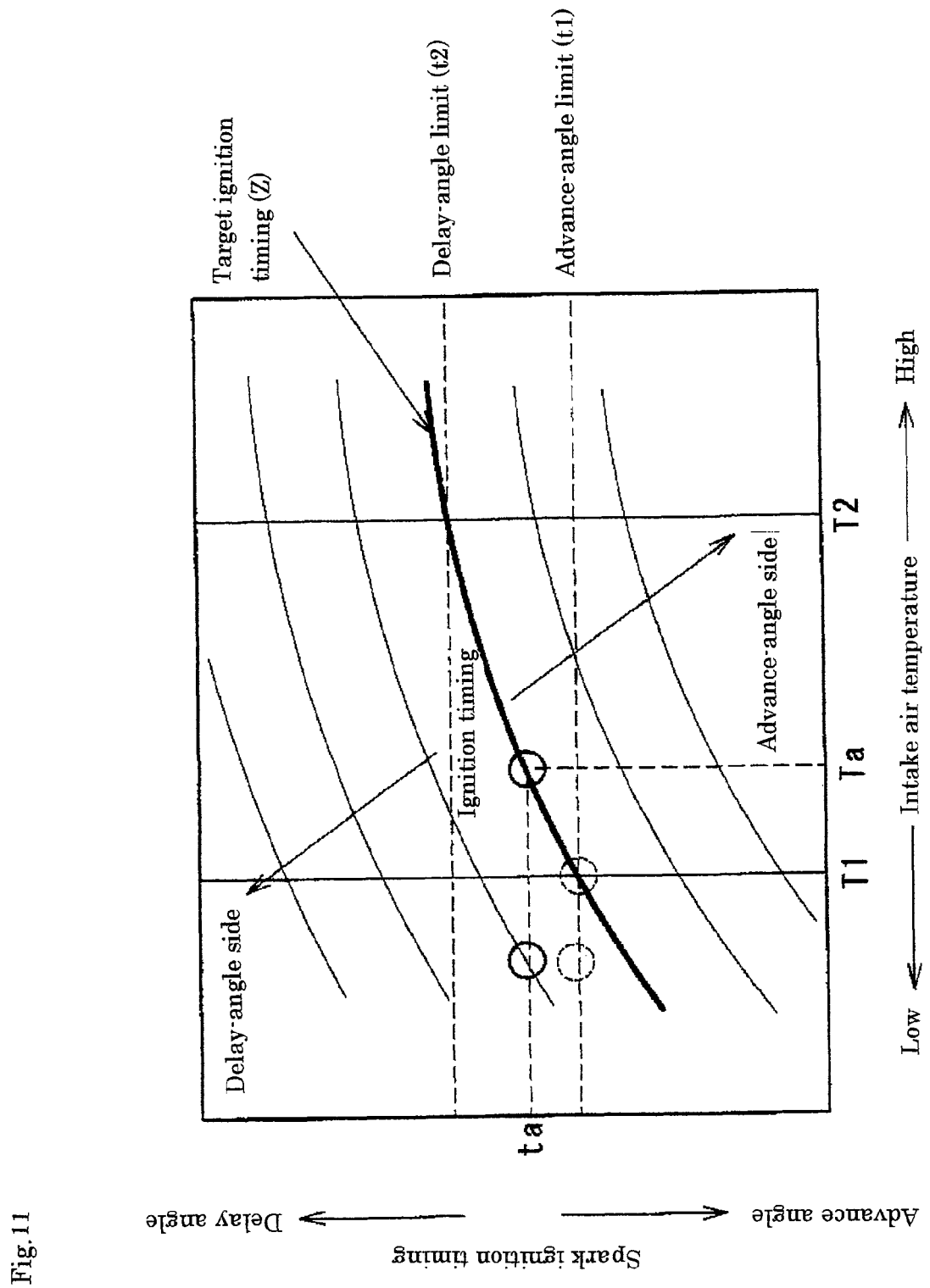
FIG. 11 is a graph showing a change in compression ignition timing in terms of a relationship between the spark ignition timing and the intake air temperature.

That the spark ignition timing is adjusted by the (2) feedback control will be described in detail. FIG. 11 is a graph showing a change in compression ignition timing in terms of a relationship between the spark ignition timing and the intake air temperature for a certain cylinder. In the graph of FIG. 11, the letter Z designates the target compression ignition timing (for example, timing of a crank angle of TDC+6°). As can be seen from the graph of FIG. 11, when spark ignition timing is adjusted to ta at an intake air temperature of Ta, the actual compression ignition timing can be matched with the target compression ignition timing.

As described in the operating method 1, the spark ignition timing includes the advance-angle limit t1 and the delay-angle limit t2 in which the compression ignition timing can be adjusted. However, even if the spark ignition is performed between the advance-angle limit t1 and the delay-angle limit t2, sometimes the actual compression ignition timing cannot be matched with the target compression ignition timing. For example, when the intake air temperature is lower than T1, the actual compression ignition timing is delayed from the target compression ignition timing even if the spark ignition is performed near the advance-angle limit t1. On the contrary, when the intake air temperature is higher than T2, the actual compression ignition timing is advanced from the target compression ignition timing even if the spark ignition is performed near the delay-angle limit t2.

Therefore, in the invention, the intake air temperature is adjusted between T1 and T2 by the heating device (temperature controller) 35 shown in FIG. 2, in the case where the intake air temperature is lower than T1, and in the case where the intake air temperature is higher than T2. Then the actual compression ignition timing can securely be matched with the target compression ignition timing by performing the spark ignition.

Figure 12:
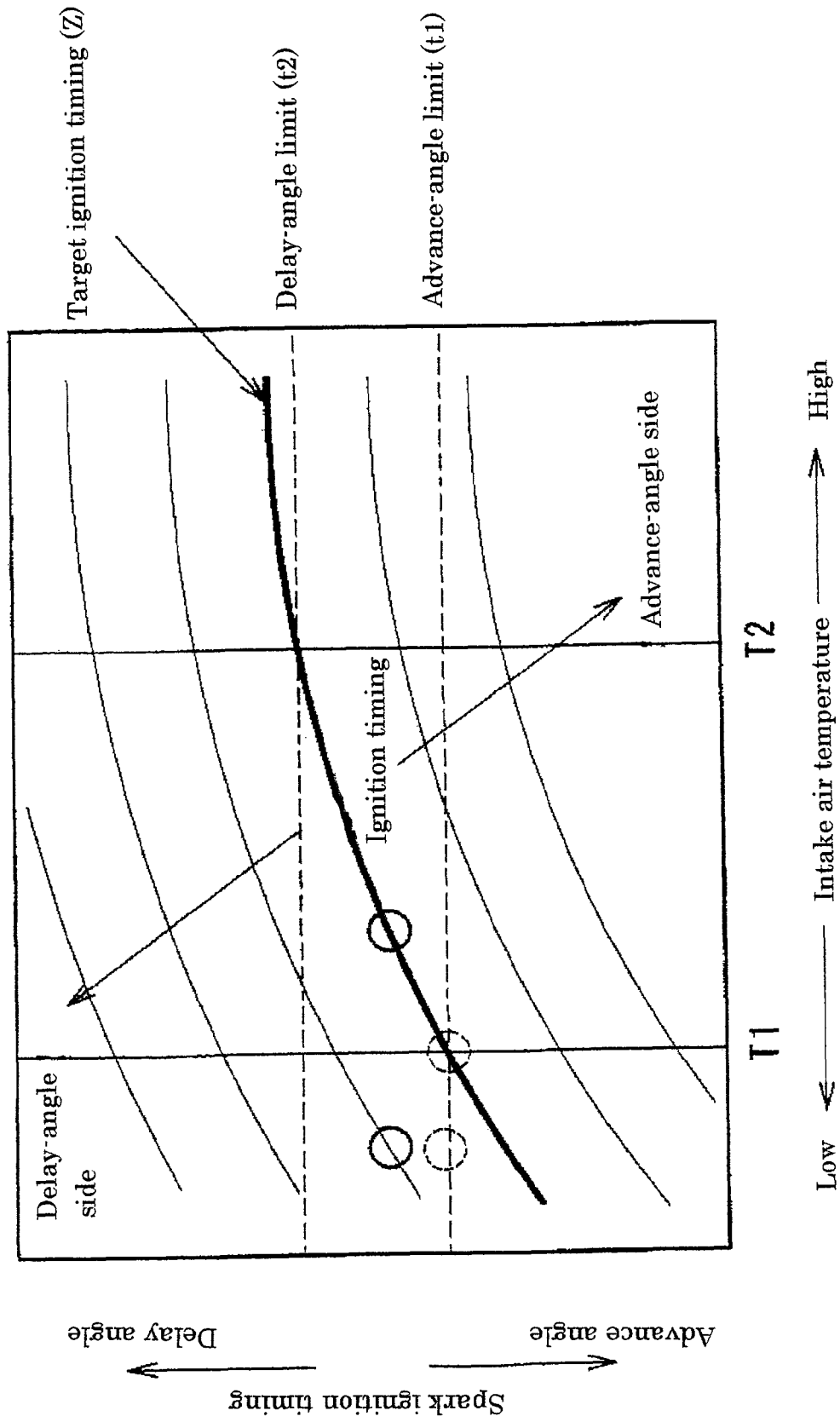
FIG. 12 is a graph showing the change in compression ignition timing in terms of the relationship between the spark ignition timing and the intake air temperature.
Figure 13:
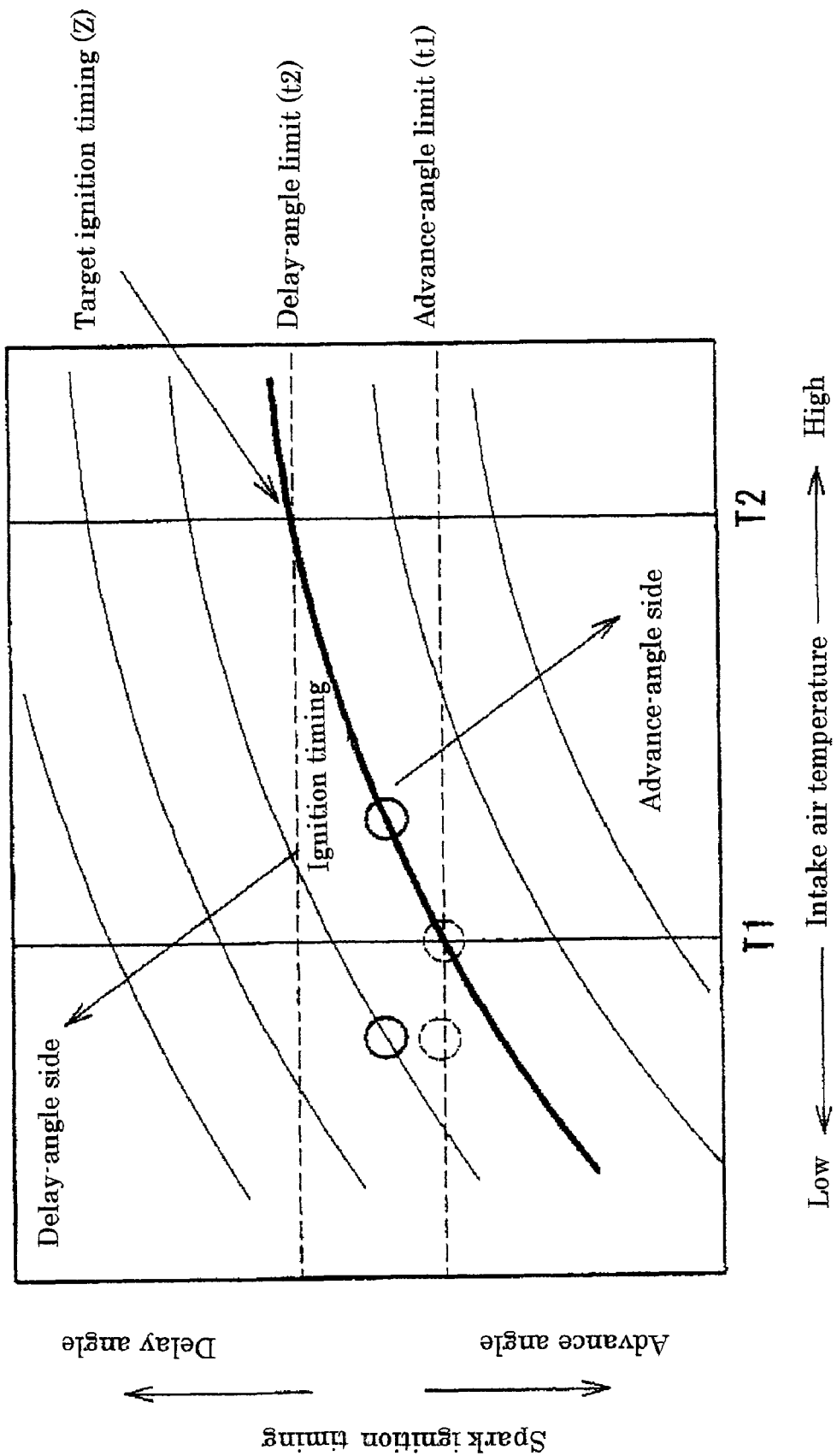
FIG. 13 is a graph showing the change in compression ignition timing in terms of the relationship between the spark ignition timing and the intake air temperature.

The intake air temperature range of T1 to T2 where the actual compression ignition timing can be matched with the target compression ignition timing by the spark ignition depends on the cylinder. For example, the intake air temperature range of T1 to T2 is shifted toward the low-temperature side as shown in FIG. 12 in the cylinder in which the compression ignition is easily performed, and the intake air temperature range of T1 to T2 is shifted toward the high-temperature side as shown in FIG. 13 in the cylinder in which the compression ignition is hardly performed. Therefore, in the invention, the heating device 35 is controlled such that the actual intake air temperature falls within the intake air temperature range in which the actual compression ignition timing can be matched with the target compression ignition timing in all the cylinders.

Figure 10:
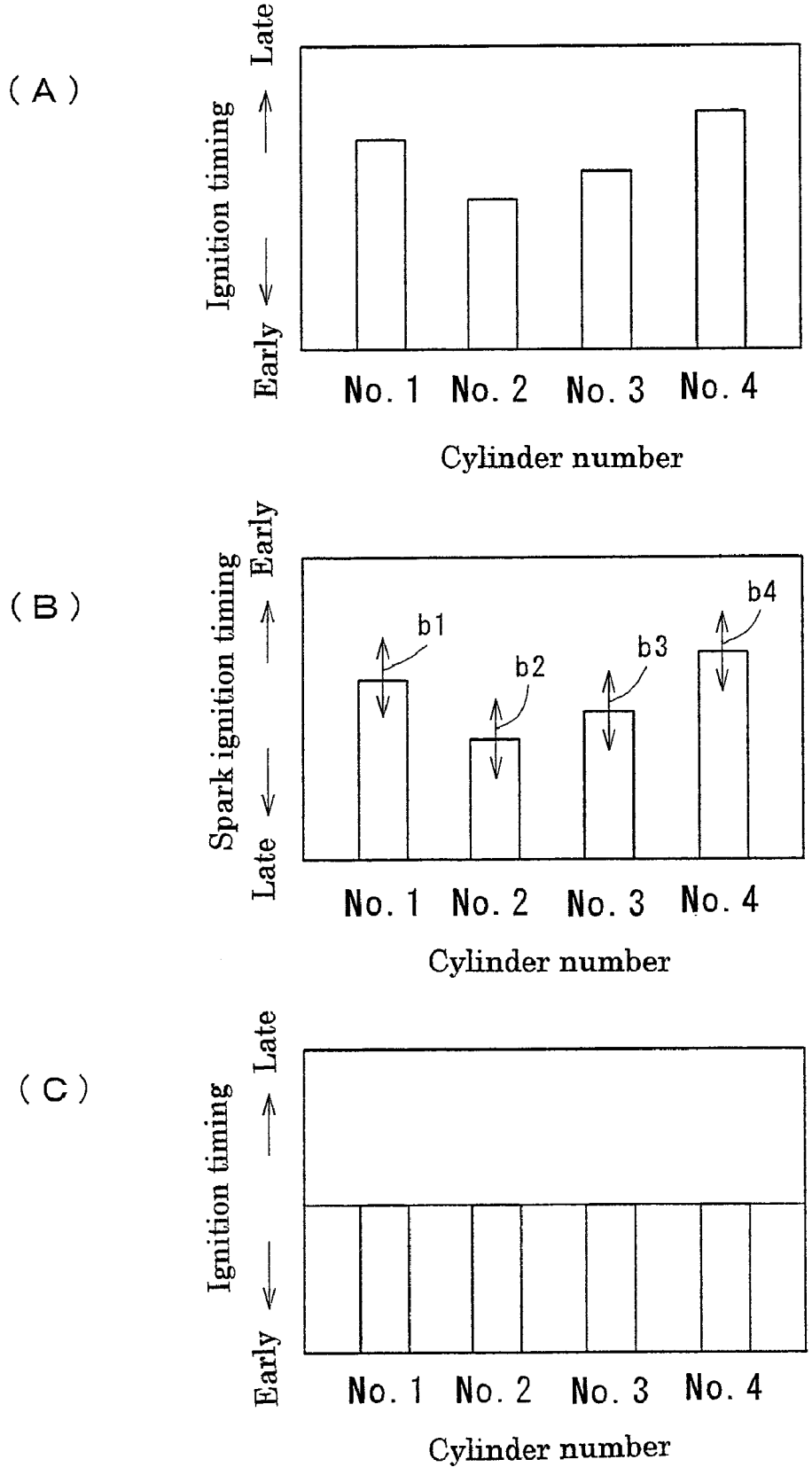
FIG. 10(A) is a graph showing the compression ignition timing of each cylinder in the case where the spark ignition is not performed.
FIG. 10(B) is a graph showing the spark ignition timing.
FIG. 10(C) is a graph showing the compression ignition timing in the case where the spark ignition is performed.
Figure 14:
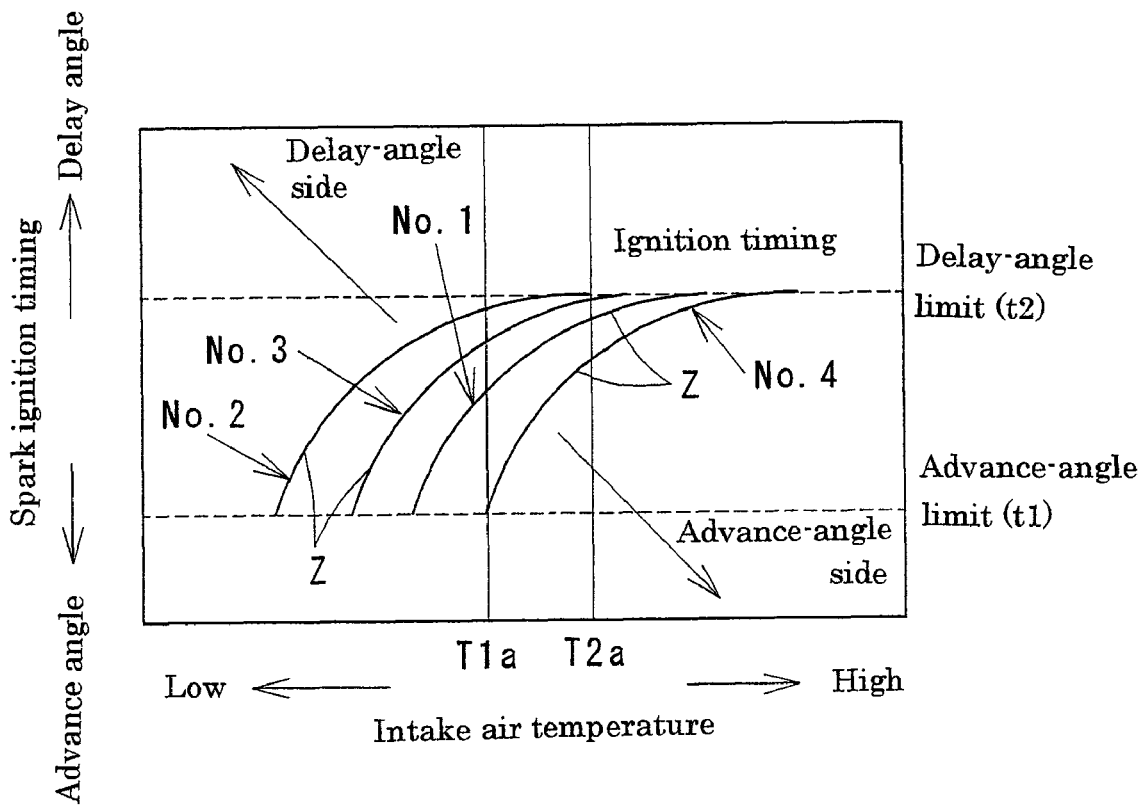
FIG. 14 is a graph showing the change in compression ignition timing in terms of the relationships between the spark ignition timing and the intake air temperature of all the cylinders.

In the engine in the operating condition of FIG. 10, for example, the compression ignition becomes difficult in the order of second cylinder (No. 2)—third cylinder (No. 3)—first cylinder (No. 1)—fourth cylinder (No. 4). At this point, as shown in FIG. 14, a curved indicating the target compression ignition timing Z is shifted from the low-temperature side toward the high-temperature side of the intake air temperature in the order of second cylinder (No. 2)—third cylinder (No. 3)—first cylinder (No. 1)—fourth cylinder (No. 4). Therefore, an intake air temperature range of T1a to T2a where all the curved Z indicating the target compression ignition timing between the advance-angle limit t1 and the delay-angle limit t2 are overlapped with one another is set, and the adjustment is made such that the actual intake air temperature falls within the range of T1a to T2a. Therefore, the actual compression ignition timing can be matched with the target compression ignition timing in all the cylinders.

When the intake air temperature is adjusted within the predetermined intake air temperature range of T1a to T2a, basically the compression ignition can be timed in all the cylinders. However, the optimum spark ignition timing is previously set in terms of the relationship with the intake air temperature such that the target compression ignition timing can be achieved, and the intake air temperature is adjusted at a particular temperature such that the spark ignition is performed at the spark ignition timing.

Figure 15:
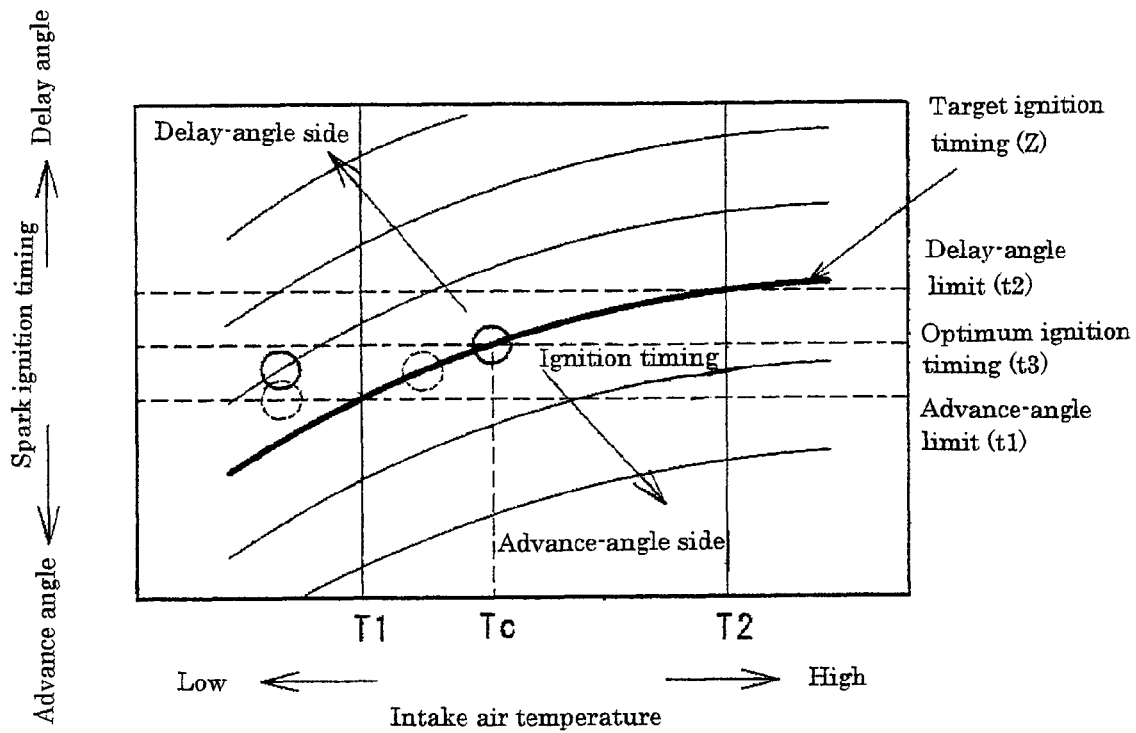
FIG. 15 is a graph showing the change in compression ignition timing in terms of the relationship between the spark ignition timing and the intake air temperature when optimum spark ignition timing is set.

For example, as shown in FIG. 15, in the case where optimum spark ignition timing t3 is set between the advance-angle limit t1 and the delay-angle limit t2, the intake air temperature is adjusted to Tc such that the spark ignition is performed at the optimum spark ignition timing t3.

Figure 16:
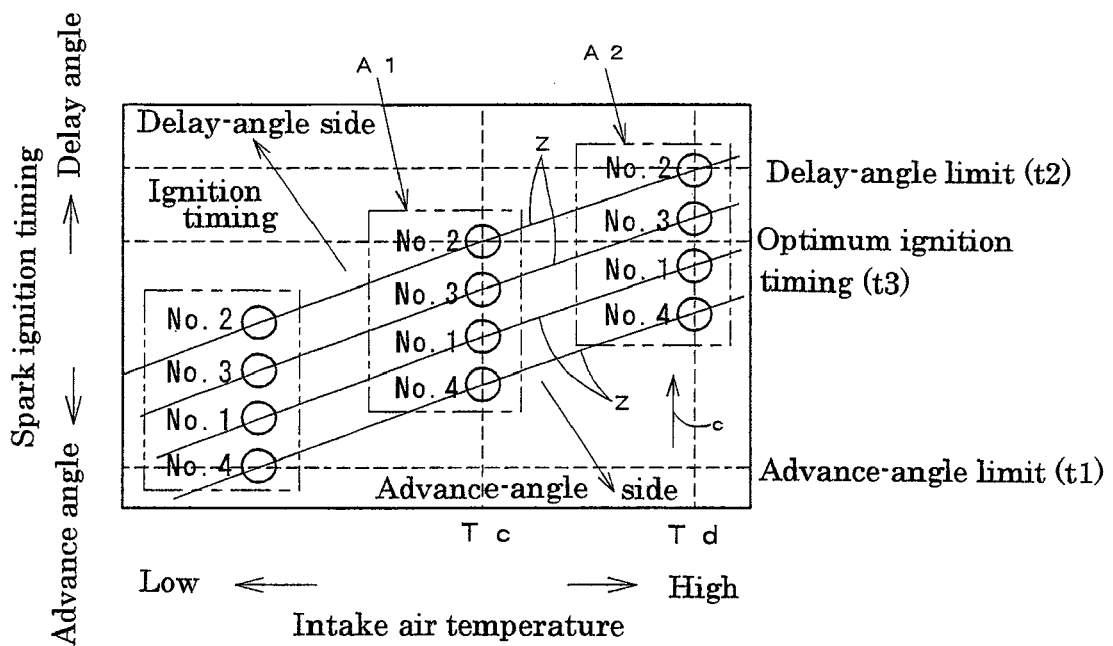
FIG. 16 is a graph showing the change in compression ignition timing in terms of the relationship between the spark ignition timing and the intake air temperature when the optimum spark ignition timing is set.

In the case of the plural-cylinder engine, the intake air temperature can be adjusted such that the spark ignition is performed at the optimum spark ignition timing in the cylinder having the latest spark ignition timing. For example, as shown in FIG. 16, in the case where the second cylinder (No. 2) has the latest spark ignition timing in the four cylinders, the intake air temperature can be adjusted to Tc such that the spark ignition timing of the second cylinder (No. 2) becomes the optimum spark ignition timing t3 like the condition surrounded by a frame A1.

The optimum spark ignition timing t3 can be set at the delay-angle limit t2 as one of the methods for setting the optimum spark ignition timing t3 of the cylinder (No. 2) having the latest spark ignition timing. For example, in FIG. 16, the intake air temperature can be adjusted to Td such that the spark ignition timing of the second cylinder (No. 2) becomes the delay-angle limit t2 like the condition surrounded by a frame A2 located on the right end.

At this point, in the second cylinder (No. 2), because the compression ignition is naturally generated, the need for performing the spark ignition is not eliminated, and the compression ignition supplemented by the spark ignition can be minimized. When the spark ignition timing of the second cylinder (No. 2) is set at the delay-angle limit t2, the spark ignition timing of each of other cylinders (No. 3, No. 1, and No. 4) is also separated from the advance-angle limit t1 toward the delay-angle side (direction of an arrow c). As shown in FIG. 5, when the spark ignition timing becomes earlier from the advance-angle limit t1 toward the advance-angle side, the compression ignition timing cannot be controlled at all. Accordingly, in all the cylinders, the spark ignition timing is separated from the advance-angle limit t1 toward the delay-angle side, whereby a possibility of not controlling the compression ignition timing can extremely be lowered.

(Application of Operating Methods 3 and 4 to Single-Cylinder Engine)

In the operating methods 3 and 4, the compression ignition timing is adjusted in order to time the compression ignition in all the cylinders. From the viewpoint of adjusting compression ignition timing, the operating methods 3 and 4 can be also applied to the single-cylinder homogeneous charge compressed ignition engine. That is, for example, the actual compression ignition timing can be adjusted at the proper compression ignition timing in which the high thermal efficiency can be obtained, or the actual compression ignition timing can be adjusted at the proper compression ignition timing in which the emission amount of air-pollution substance contained in the exhaust gas can be restrained.

(Operating Method 5)

In the operating methods 1 to 4 as described above, the compression ignition is induced by the supplementary use of the spark ignition, and the advance-angle limit t1 and the delay-angle limit t2 of the spark ignition timing are set to perform the spark ignition within the range of the advance-angle limit t1 and the delay-angle limit t2. The intake air temperature is adjusted by the spark ignition between the advance-angle limit t1 and the delay-angle limit t2, which allows the actual compression ignition timing to be matched with the target compression ignition timing.

Figure 28:
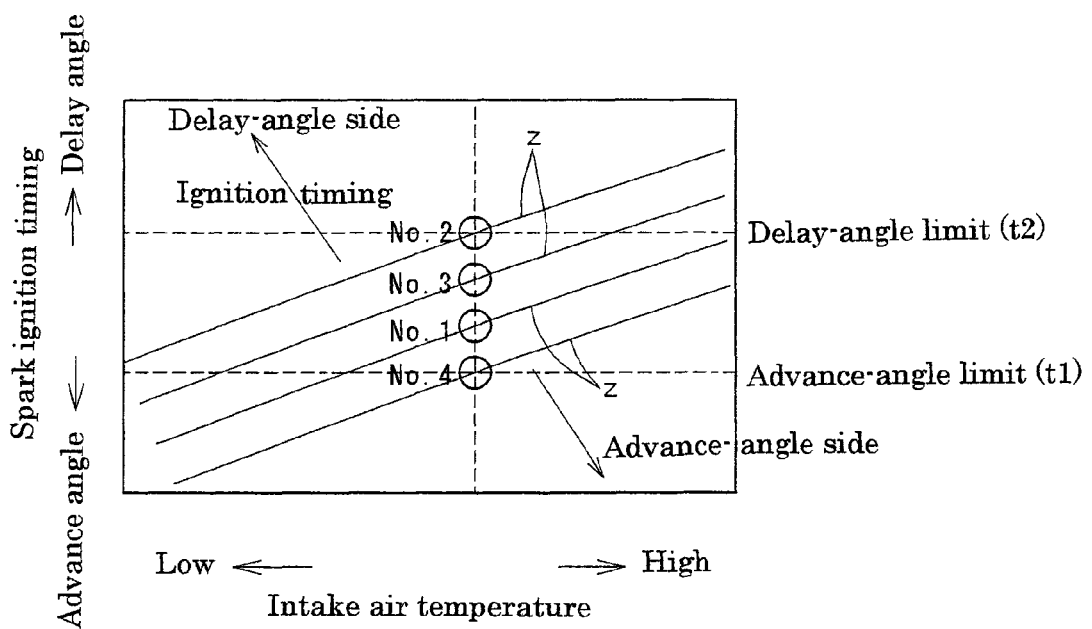
FIG. 28 is a graph showing the change in compression ignition timing in terms of the relationship between the spark ignition timing and the intake air temperature.

However, even if the means are adopted, sometimes the spark ignition timing becomes the delay-angle limit t2 in the cylinder having the latest spark ignition timing while the spark ignition timing becomes the advance-angle limit t1 in the cylinder having the earliest spark ignition timing as shown in FIG. 28, that is, the adjustment range of T1a to T2a of the intake air temperature is eliminated in FIG. 14. In an operating method 5 of the invention, the following additional means is performed in such cases.

(Operating Method 5-1)

Figure 17:
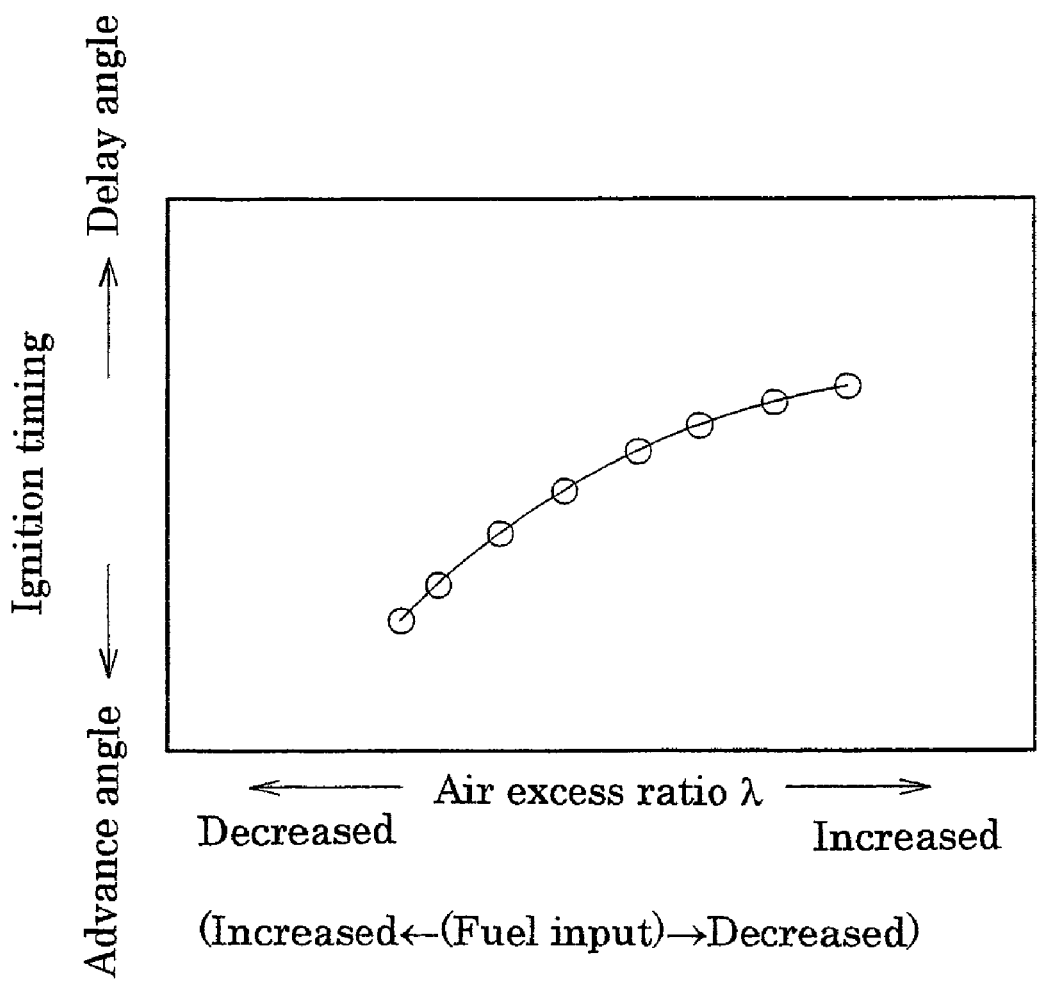
FIG. 17 is a graph showing a relationship between the air excess ratio and the compression ignition timing when the intake air temperature is kept constant.
Figure 18:
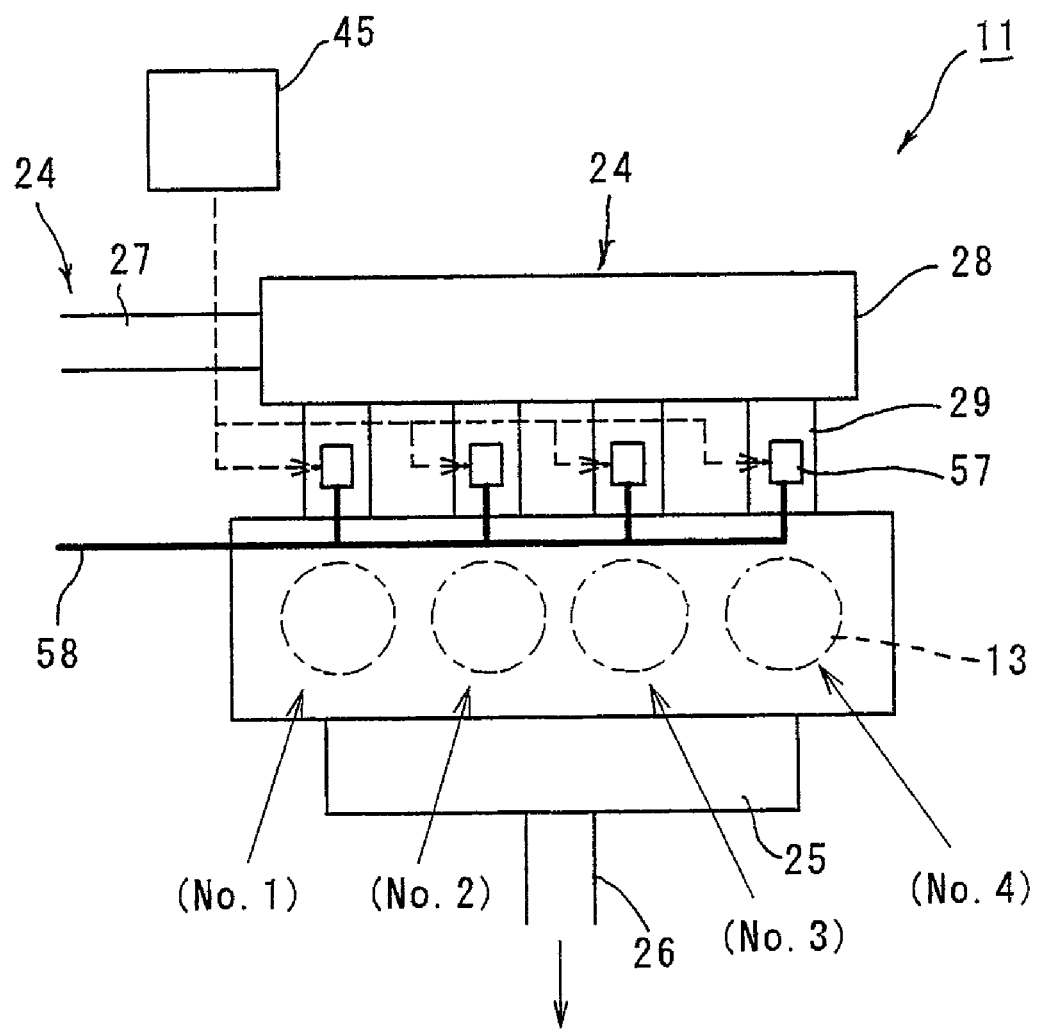
FIG. 18 is a plan view schematically showing a homogeneous charge compressed ignition engine in which a fuel regulating valve is provided in a branched intake pipe.

FIG. 17 is a graph showing a relationship between the air excess ratio and the compression ignition timing when the intake air temperature is kept constant. As can be seen from the graph of FIG. 17, the compression ignition timing is advanced as the air excess ratio is decreased, and the compression ignition timing is delayed as the air excess ratio is increased. In the operating method 5-1, as shown in FIG. 18, a fuel regulating valve 57 which can further add the fuel to the mixture gas is provided in the branched intake pipe 29 of each of the cylinders (No. 1 to No. 4) by utilizing the characteristic. Each fuel regulating valve 57 is controlled by the controller 45. The numeral 58 designates a fuel supply pipe through which the fuel is delivered to each fuel regulating valve 57. In FIG. 18, only a part of the fuel supply system is shown, and other configurations are not given because other configurations are identical to those of FIG. 2.

In the case of the existence of the cylinder in which the spark ignition timing becomes the advance-angle limit t1 even if the intake air temperature is adjusted, the additional fuel is appropriately supplied to the cylinder from the fuel regulating valve 57 to easily perform the compression ignition. Therefore, the spark ignition timing can be transferred from the advance-angle limit t1 toward the delay-angle side.

Alternatively, the additional fuel is always supplied from the fuel regulating valve 57 to all the cylinders. When the spark ignition timing becomes the advance-angle limit t1 in a certain cylinder, the additional amount of fuel supplied to the cylinder is appropriately increased compared with other cylinders. Therefore, similarly the spark ignition timing can be transferred from the advance-angle limit t1 toward the delay-angle side. On the contrary, for the cylinder in which the spark ignition timing becomes the delay-angle limit t2, the fuel supply amount is relatively decreased to hardly perform the compression ignition, which allows the spark ignition timing to be advanced from the delay-angle limit t2.

Therefore, in each cylinder, the spark ignition can be performed within the range of the advance-angle limit t1 and the delay-angle limit t2 (timing later than the advance-angle limit t1 and earlier than the delay-angle limit t2) to achieve the target compression ignition timing.

In the case where the cylinder in which the spark ignition timing always becomes the advance-angle limit t1 is previously specified, the fuel regulating valve 57 can be provided only in the cylinder.

The fuel control valve 32 and the mixer 33 of FIG. 1 are removed, and the fuel is supplied only from the fuel regulating valve 57 of FIG. 18.

(Operating Method 5-2)

In an operating method 5-2, means for changing an effective compression ratio of each cylinder is provided. As shown in FIG. 1, a recessed combustion chamber 60 is formed in an upper surface of the piston, and the effective compression ratio is decreased as the combustion chamber 60 is increased, and the effective compression ratio is increased as the combustion chamber 60 is decreased. The compression ignition is hardly performed as the effective compression ratio is decreased, and the compression ignition is easily performed as the effective compression ratio is increased.

Accordingly, in the case of the existence of the cylinder in which the spark ignition timing becomes the advance-angle limit t1 even if the intake air temperature is adjusted as described above, the combustion chamber 60 of the cylinder is previously formed smaller than other cylinders to easily perform the compression ignition, and the spark ignition timing is delayed from the advance-angle limit t1. In the case of the existence of the cylinder in which the spark ignition timing becomes the delay-angle limit t2, the combustion chamber 60 of the cylinder is previously formed larger than other cylinders to hardly perform the compression ignition, and the spark ignition timing is advanced from the delay-angle limit t2.

Therefore, in each cylinder, the spark ignition can be performed between the advance-angle limit t1 and the delay-angle limit t2 (timing later than the advance-angle limit t1 and earlier than the delay-angle limit t2) to achieve the target compression ignition timing.

In the above description, instead of or in addition to the combustion chamber 60, a recess (not shown) is provided in a lower surface of the cylinder head 15, and the effective compression ratio can be changed by dimensions of the recess. As shown in FIG. 1, the effective compression ratio can be changed by changing a projection amount p of the ignition plug 37 from the cylinder head 15. In such cases, the effective compression ratio is increased when the projection amount p of the ignition plug 37 is increased, and the effective compression ratio is decreased when the projection amount p of the ignition plug 37 is decreased. Accordingly, similarly to the case in which the dimensions of the combustion chamber 60 are changed, the projection amount p of the ignition plug 37 is previously changed, and the spark ignition is performed between the advance-angle limit t1 and the delay-angle limit t2 in each cylinder, which allows the target compression ignition timing to be achieved.

The volume of the combustion chamber 60 and the projection amount p of the ignition plug 37 depend on the structure, and the effective compression ratio cannot variably be set according to the always-changing operating condition. Therefore, means for variably setting the effective compression ratio can be provided as follows.

As shown in FIG. 1, the variable valve mechanism is used as the valve mechanism 21 of the intake valve 19, and the controller 45 controls the variable valve mechanism 21 to close early or late the intake valve 19, thereby variably setting the effective compression ratio. The early closing of the intake valve 19 shall mean that the intake valve 19 is closed before the piston 14 reaches a bottom dead center in the intake stroke, and the effective compression ratio can be decreased compared with the cylinder in which the intake valve 19 is not closed early. The effective compression ratio can be decreased as an early closing amount is increased (closing timing is advanced). The late closing of the intake valve 19 shall mean that the intake valve 19 is closed after the piston 14 reaches the bottom dead center in the intake stroke, and the effective compression ratio can be decreased compared with the cylinder in which the intake valve 19 is not closed late. The effective compression ratio can be decreased as a late closing amount is increased (closing timing is delayed).

In the case of the existence of the cylinder in which the spark ignition timing becomes the delay-angle limit t2 according to the operating condition, the intake valve 19 of the cylinder is closed early or late as appropriate, and the effective compression ratio of the cylinder is decreased relative to other cylinders to hardly perform the compression ignition. Therefore, the spark ignition timing can be advanced from the delay-angle limit t2.

Alternatively, the intake valve 19 is always closed early or late in all the cylinders, and the early closing amount or late closing amount of the intake valve 19 of the cylinder is appropriately decreased (or eliminated) in the case of the existence of the cylinder in which the spark ignition timing becomes the advance-angle limit t1 according to the operating condition. Therefore, the effective compression ratio can be increased to transfer the spark ignition timing from the advance-angle limit t1 toward the delay-angle side. On the contrary, the early closing amount or late closing amount of the intake valve 19 of the cylinder is appropriately increased in the case of the existence of the cylinder in which the spark ignition timing becomes the delay-angle limit t2. Therefore, the effective compression ratio can be decreased to transfer the spark ignition timing from the delay-angle limit t2 toward the advance-angle side.

The setting of effective compression ratio by the early closing or late closing of the intake valve 19 can be changed or fixed as described above. That is, in the case where the cylinder in which the spark ignition timing becomes the advance-angle limit t1 is specified, the setting of the early closing amount or late closing amount of the intake valve 19 of the cylinder is previously decreased (or eliminated) compared with other cylinders, and the compression ignition is easily performed to delay the spark ignition timing from the advance-angle limit t1. In the case where the cylinder in which the spark ignition timing becomes the delay-angle limit t2 is specified, the setting of the early closing amount or late closing amount of the intake valve 19 of the cylinder is previously increased compared with other cylinders, and the compression ignition is hardly performed to advance the spark ignition timing from the delay-angle limit t2.

(Operating Method 5-3)

Figure 19:
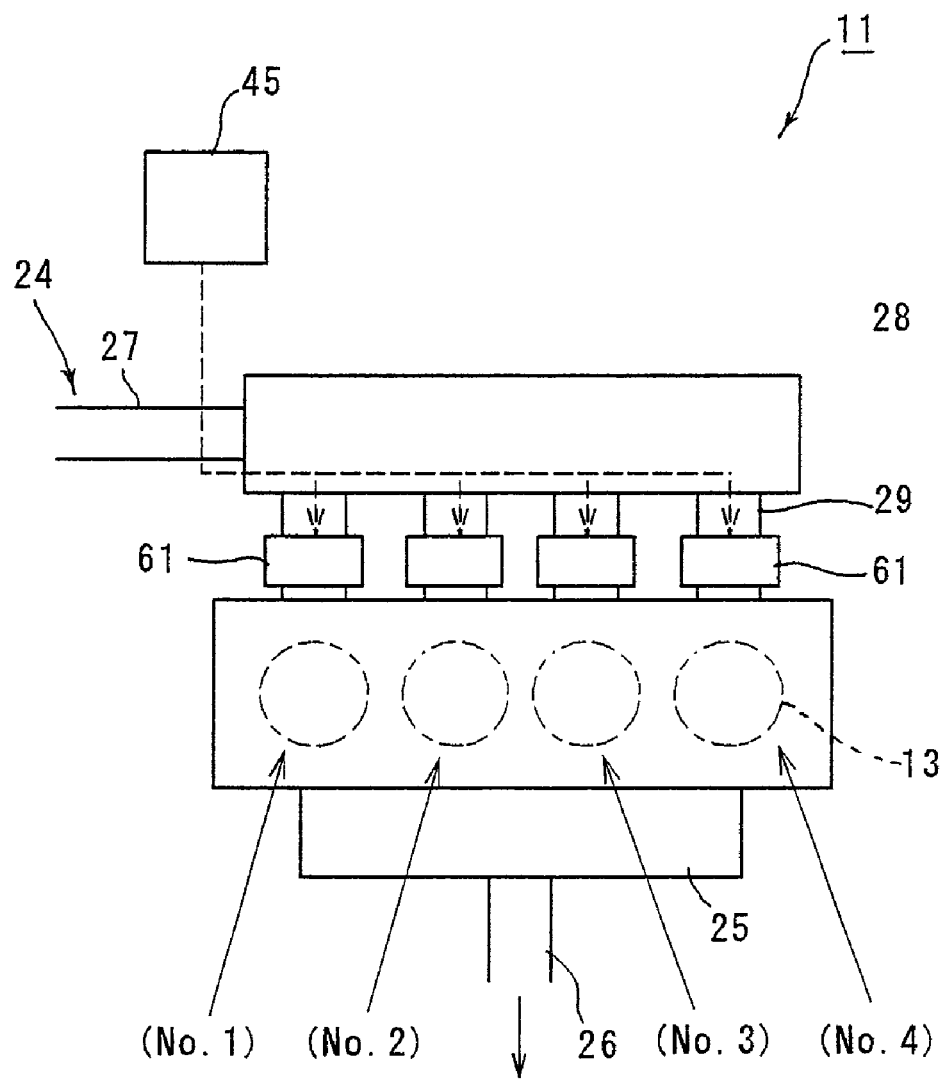
FIG. 19 is a plan view schematically showing a homogeneous charge compressed ignition engine in which heater is provided in the branched intake pipe.

In an operating method 5-3, the intake air temperature of each cylinder can further be adjusted such that the spark ignition timing is located between the advance-angle limit t1 and the delay-angle limit t2. As shown in FIG. 19, a heater 61 controlled by the controller 45 is provided in the branched intake pipe 29 connected to each cylinder, and a temperature of the mixture gas flowing through the branched intake pipe 29 can individually be adjusted. In the case of the existence of the cylinder in which the spark ignition timing becomes the advance-angle limit t1 according to the operating condition, the heater 61 is appropriately actuated in the cylinder to raise the intake air temperature relative to other cylinders. Therefore, the compression ignition is easily performed, and the spark ignition timing can be transferred toward the delay-angle side from the advance-angle limit t1.

Alternatively, the heaters 61 are always actuated in all the cylinders, and a heating amount of the cylinder is appropriately increased relative to other cylinders in the case of the existence of the cylinder in which the spark ignition timing becomes the advance-angle limit t1 according to the operating condition. Therefore, the spark ignition timing can be transferred toward the delay-angle side from the advance-angle limit t1. On the contrary, in the case of the existence of the cylinder in which the spark ignition timing becomes the delay-angle limit t2, the heating amount of the cylinder is appropriately decreased relative to other cylinders. Therefore, the spark ignition timing can be transferred toward the advance-angle side from the delay-angle limit t2.

An electric heating element or a heat exchanger can be used as the heater 61. In the heat exchanger, the exhaust gas, the engine oil, or the engine cooling water can be used as a heat exchange medium. A cooling device can be provided instead of the heater 61. For example, a radiator fin is provided in the branched intake pipe 29 whose intake air temperature should be lowered, or the branched intake pipe 29 is cooled by the cooling water.

(Operating Method 5-4)

In an operating method 5-4, similarly to the operating method 5-3, the intake air temperature is further adjusted in each cylinder such that the spark ignition timing is located between the advance-angle limit t1 and the delay-angle limit t2. In the operating method 5-4, internal EGR means is used to adjust the intake air temperature.

The internal EGR means is achieved by the early closing or reopening of the exhaust valve 20 (FIG. 1) or pre-lift of the intake valve 19 (FIG. 1).

The early closing of the exhaust valve 20 shall mean that the exhaust valve 20 is closed before the piston 14 reaches the top dead center in the exhaust stroke. The exhaust gas is caused to remain in the cylinder 13 by the early closing of the exhaust valve 20, and the remaining exhaust gas is mixed with the mixture gas flowing in the subsequent intake stroke, which allows the mixture gas temperature (intake air temperature) to be raised. As the early closing amount of the exhaust valve 20 is increased (closing timing is advanced), an internal EGR amount can be increased to raise the intake air temperature.

At this point, as shown in FIG. 1, the valve mechanism 22 of the exhaust valve 20 is formed by the variable valve mechanism, and the variable valve mechanism 22 is controlled by the controller 45, thereby adjusting the presence or absence of the early closing or the early closing amount. In the case of the existence of the cylinder in which the spark ignition timing becomes the advance-angle limit t1 according to the operating condition, the exhaust valve 20 of the cylinder is closed early as appropriate or the early closing amount is increased, and the mixture gas temperature is raised relative to other cylinders to easily perform the compression ignition. Therefore, the spark ignition timing can be transferred toward the delay-angle side from the advance-angle limit t1.

In the case of the existence of the cylinder in which the spark ignition timing becomes the delay-angle limit t2 according to the operating condition, the exhaust valve 20 of the cylinder is not closed early as appropriate or the early closing amount is decreased, and the mixture gas temperature is lowered relative to other cylinders to hardly perform the compression ignition. Therefore, the spark ignition timing can be transferred toward the advance-angle side from the delay-angle limit t2.

The reopening of the exhaust valve 20 shall mean that the exhaust valve 20 is temporarily opened in the intake stroke. The exhaust gas remaining in the exhaust pipe 26 flows into the cylinder 13 by the reopening of the exhaust valve 20, the exhaust gas is mixed with the mixture gas flowing from the intake pipe 24, thereby raising the mixture gas temperature. As a reopening amount (a lift amount or a duration time of the reopening) of the exhaust valve 20 is increased, the internal EGR amount can be increased to raise the mixture gas temperature.

Accordingly, in the case of the existence of the cylinder in which the spark ignition timing becomes the advance-angle limit t1 according to the operating condition, the exhaust valve 20 of the cylinder is appropriately reopened or the reopening amount is increased, and the mixture gas temperature is raised relative to other cylinders to easily perform the compression ignition. Therefore, the spark ignition timing can be transferred toward the delay-angle side from the advance-angle limit t1.

In the case of the existence of the cylinder in which the spark ignition timing becomes the delay-angle limit t2 according to the operating condition, the exhaust valve 20 of the cylinder is not appropriately reopened or the reopening amount is decreased, and the mixture gas temperature is lowered relative to other cylinders to hardly perform the compression ignition. Therefore, the spark ignition timing can be transferred toward the advance-angle side from the delay-angle limit t2.

The pre-lift of the intake valve 19 shall mean that the intake valve 19 is temporarily opened in the exhaust stroke. The exhaust gas in the cylinder 13 flows into the intake pipe 24 by the pre-lift of the intake valve 19, and the exhaust gas flows into the cylinder 13 again in the subsequent intake stroke while the exhaust gas is mixed with the mixture gas, so that the mixture gas temperature can be raised. As a pre-lift amount (a lift amount or a duration time of the pre-lift) of the intake valve 19 is increased, the internal EGR amount can be increased to raise the mixture gas temperature.

Accordingly, in the case of the existence of the cylinder in which the spark ignition timing becomes the advance-angle limit t1 according to the operating condition, the intake valve 19 of the cylinder is appropriately pre-lifted or the pre-lift amount is increased to increase the EGR amount, and the mixture gas temperature is raised relative to other cylinders to easily perform the compression ignition. Therefore, the spark ignition timing can be transferred toward the delay-angle side from the advance-angle limit t1.

In the case of the existence of the cylinder in which the spark ignition timing becomes the delay-angle limit t2 according to the operating condition, the intake valve 19 of the cylinder is not appropriately pre-lifted or the pre-lift amount is decreased to eliminate or decrease the EGR amount, and the intake air temperature is lowered relative to other cylinders to hardly perform the compression ignition. Therefore, the spark ignition timing can be transferred toward the advance-angle side from the delay-angle limit t2.

The early closing or reopening of the exhaust valve 20 or the increase or decrease in internal EGR amount by the pre-lift of the intake valve 19 can be changed or fixed as described above. That is, in the case where the cylinder in which the spark ignition timing becomes the advance-angle limit t1 is specified, the early closing amount or reopening amount of the exhaust valve 20 of the cylinder or the pre-lift amount of the intake valve 19 is previously set larger to easily perform the compression ignition, and the spark ignition timing is delayed from the advance-angle limit t1. In the case where the cylinder in which the spark ignition timing becomes the delay-angle limit t2 is specified, the early closing amount or reopening amount of the exhaust valve 20 of the cylinder or the pre-lift amount of the intake valve 19 is previously eliminated or set smaller to hardly perform the compression ignition, and the spark ignition timing is advanced from the delay-angle limit t2.

(Operating Method 5-5)

In an operating method 5-5, similarly to the operating method 5-4, the intake air temperature is further adjusted in each cylinder such that the spark ignition timing is located between the advance-angle limit t1 and the delay-angle limit t2. In the operating method 5-5, external EGR means is used to adjust the intake air temperature.

Figure 20:
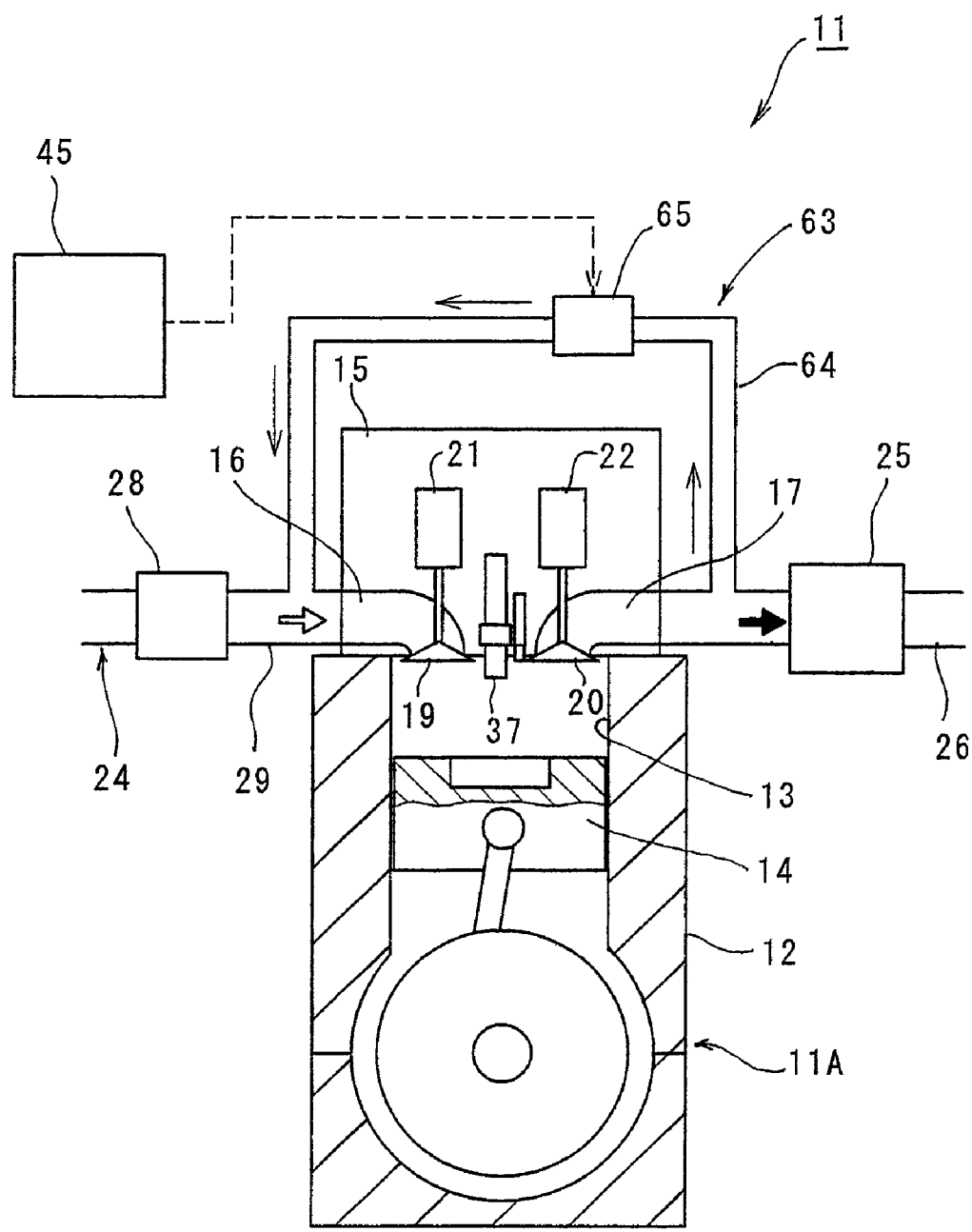
FIG. 20 is a sectional view schematically showing a homogeneous charge compressed ignition engine provided with an external EGR device.

As shown in FIG. 20, external EGR means 63 includes an EGR passage 64 which connects the exhaust pipe 26 and each branched intake pipe 29 and an EGR valve 65 which is provided in the EGR passage 64. In the external EGR means 63, the exhaust gas emitted from the exhaust pipe 26 is refluxed to the intake pipe 29 through the EGR passage 64 to mix the exhaust gas and the mixture gas, thereby raising the mixture gas temperature. An external EGR amount can be adjusted by the EGR valve 65 which is controlled by the controller 45, and the mixture gas temperature can be raised as the external EGR amount is increased.

Accordingly, in the case of the existence of the cylinder in which the spark ignition timing becomes the advance-angle limit t1 according to the operating condition, the EGR valve 65 of the cylinder is appropriately adjusted to increase the external EGR amount, and the mixture gas temperature is raised relative to other cylinders to easily perform the compression ignition. Therefore, the spark ignition timing can be transferred toward the delay-angle side from the advance-angle limit t1.

In the case of the existence of the cylinder in which the spark ignition timing becomes the delay-angle limit t2 according to the operating condition, the EGR valve 65 of the cylinder is appropriately adjusted to decrease or eliminate the external EGR amount, and the intake air temperature is lowered relative to other cylinders to hardly perform the compression ignition. Therefore, the spark ignition timing can be transferred toward the advance-angle side from the delay-angle limit t2.

The external EGR amount can be changed by the EGR valve 65 or the external EGR amount can be fixed. That is, in the case where the cylinder in which the spark ignition timing becomes the advance-angle limit t1 is specified, the EGR valve 65 of the cylinder is previously adjusted to set the external EGR amount at a larger value, the compression ignition is easily performed, and the spark ignition timing is delayed from the advance-angle limit t1. In the case where the cylinder in which the spark ignition timing becomes the delay-angle limit t2 is specified, the EGR valve 65 of the cylinder is previously closed or the EGR valve 65 is previously adjusted to set the external EGR amount at a smaller value, the compression ignition is hardly performed, and the spark ignition timing is advanced from the delay-angle limit t2.

(Operating Method 5-6)

In an operating method 5-6, a temperature of the cylinder itself is adjusted, whereby the target compression ignition timing Z is achieved by the spark ignition between the advance-angle limit t1 and the delay-angle limit t2. Specifically, in the case of the existence of the cylinder (cylinder in which the compression ignition is easily performed) in which the spark ignition timing becomes the delay-angle limit t2, an amount of cooling water supplied to a peripheral portion of the cylinder is increased relative to other cylinders to promote the cooling, whereby the spark ignition timing is transferred toward the advance-angle side from the delay-angle limit t2.

Figure 21:
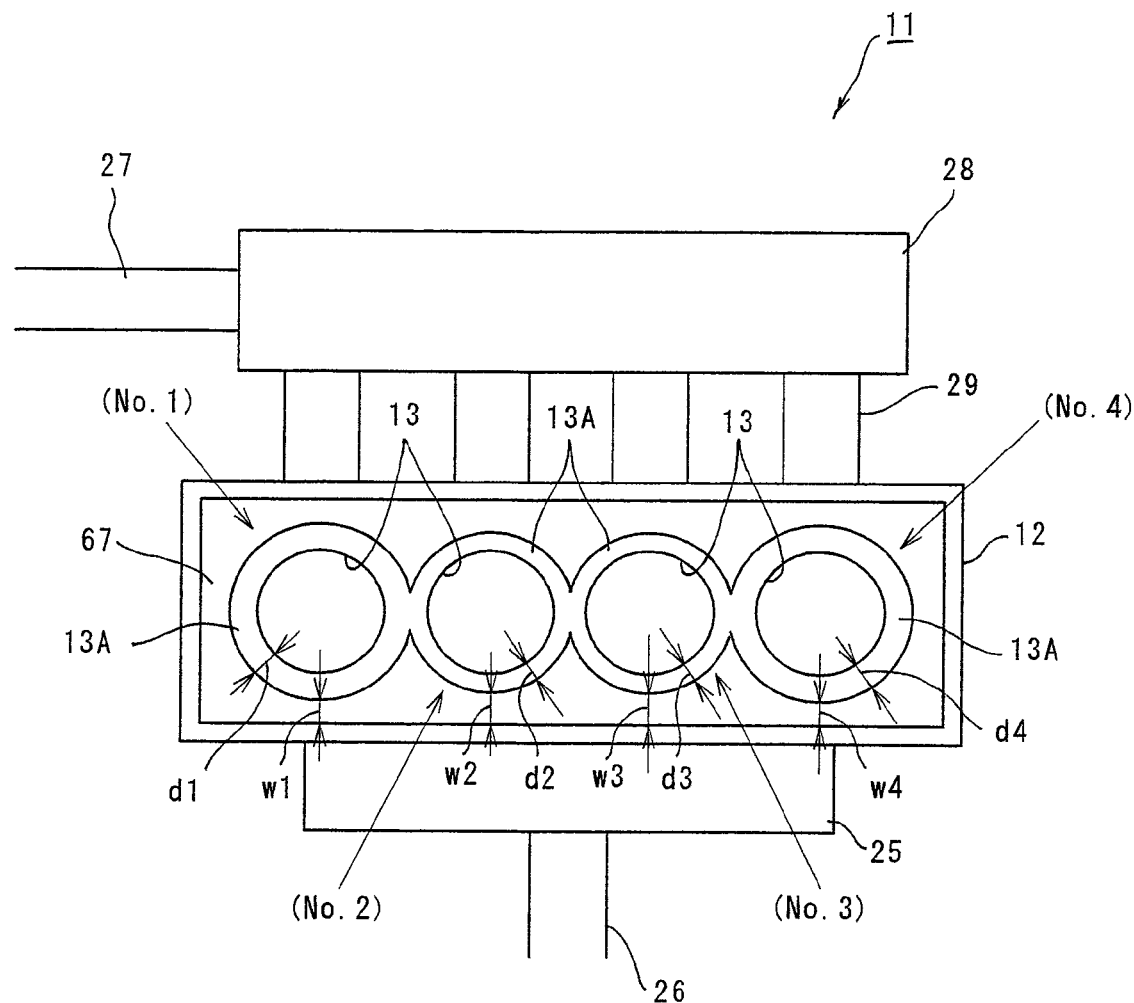
FIG. 21 is a plan sectional view schematically showing a homogeneous charge compressed ignition engine in which particularly a water jacket is illustrated in detail.

As shown in FIG. 21, thicknesses d2 and d3 of a cylinder liner 13A constituting the cylinder in which the cooling water amount should be increased, for example, the second cylinder (No. 2) and third cylinder (No. 3) is set thinner than thicknesses d1 and d4 of the cylinder liner 13A constituting the first cylinder (No. 1) and fourth cylinder (No. 4). Therefore, widths w2 and w3 of the peripheral portions of the second cylinder (No. 2) and third cylinder (No. 3) in a water jacket 67 becomes wider than widths w1 and w4 of the peripheral portions of the first cylinder (No. 1) and fourth cylinder (No. 4).

Therefore, the amount of cooling water supplied to the peripheral portions of the second cylinder (No. 2) and third cylinder (No. 3) becomes larger than the amount of cooling water supplied to the peripheral portions of the first cylinder (No. 1) and fourth cylinder (No. 4), so that cooling performance in the second cylinder (No. 2) and third cylinder (No. 3) can be enhanced compared with the first cylinder (No. 1) and fourth cylinder (No. 4).

In the above description, the cooling performance is adjusted by changing the thickness of the cylinder liner 13A. Alternatively, for example, a cooling area (range of the water jacket 67) can be enlarged for the cylinder in which the cooling performance should be enhanced.

(Operating Method 5-7)

In an operating method 5-7, a material of the component of the cylinder is changed, whereby the target compression ignition timing Z is achieved by the spark ignition between the advance-angle limit t1 and the delay-angle limit t2. Specifically, in the case of the existence of the cylinder (cylinder in which the compression ignition is easily performed) in which the spark ignition timing becomes the delay-angle limit t2, the component of the cylinder is made of a material having a high heat conductivity (high heat radiation property). On the other hand, in the case of the existence of the cylinder (cylinder in which the compression ignition is hardly performed) in which the spark ignition timing becomes the advance-angle limit t1, the component of the cylinder is made of a material having a low heat conductivity (low heat radiation property).

Therefore, the actual compression ignition timing can be set at the target compression ignition timing by the spark ignition between the advance-angle limit t1 and the delay-angle limit t2.

As shown in FIG. 1, the whole of the piston 14, a part of a top surface of the piston 14, or the whole or a part of the cylinder 13 (cylinder liner 13A) can be formed by the component of the cylinder. The method for changing the heat radiation property of the cylinder is not limited to the method for changing the material. Alternatively, for example, the heat radiation property can be changed by changing the structure of the cylinder such that a cavity constituting a heat insulating barrier is formed inside the component.

(Operating Method 6)

Even if the means of the operating methods 1 to 5 are provided, possibly the actual compression ignition timing cannot be matched with the target compression ignition timing by the spark ignition between the advance-angle limit t1 and the delay-angle limit t2. In an operating method 6 of the embodiment, additional means is provided in such cases.

In the operating method 6, the intake air temperature is set such that at least the cylinder having the latest spark ignition timing can properly (normally) be operated. As used herein, the proper operation shall mean that the maximum in-cylinder pressure and the knocking intensity fall within acceptable values.

The cylinder having the latest spark ignition timing is the cylinder in which the compression ignition is performed most easily, that is, the cylinder in which the knocking is generated most easily. Accordingly, when the compression ignition can properly performed without generating the knocking in the cylinder in which the knocking is generated most easily, the knocking is not generated in other cylinders even if the misfire is generated. Therefore, the mechanical damage of the engine 11 caused by the generation of the knocking can be prevented.

Verification of Effect of Embodiment

Figure 22:
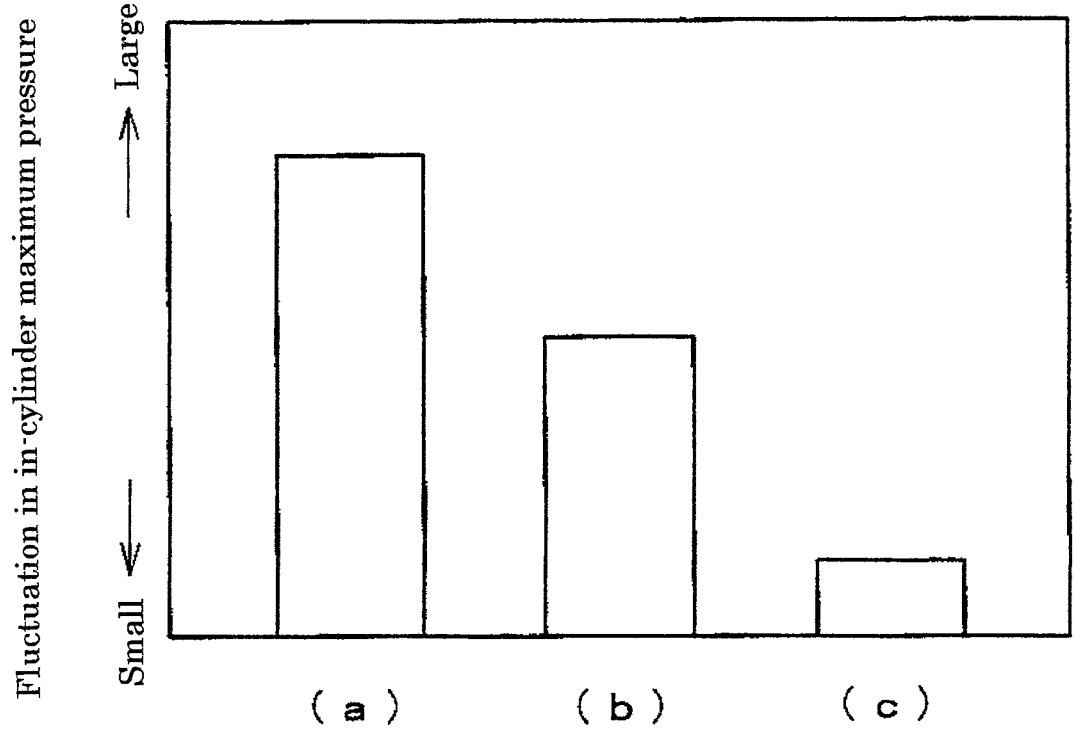
FIG. 22 is a graph showing a fluctuation in in-cylinder maximum pressure (difference between a maximum value and a minimum value) among the cylinders in the case (a) where the spark ignition is not performed, in the case (b) where the spark ignition is supplementarily performed only to a particular cylinder in which the compression ignition is not performed by an operating method 1, and in the case (c) where the spark ignition is supplementarily performed to all the cylinders by an operating method 4 in order to time the compression ignition.
Figure 23:
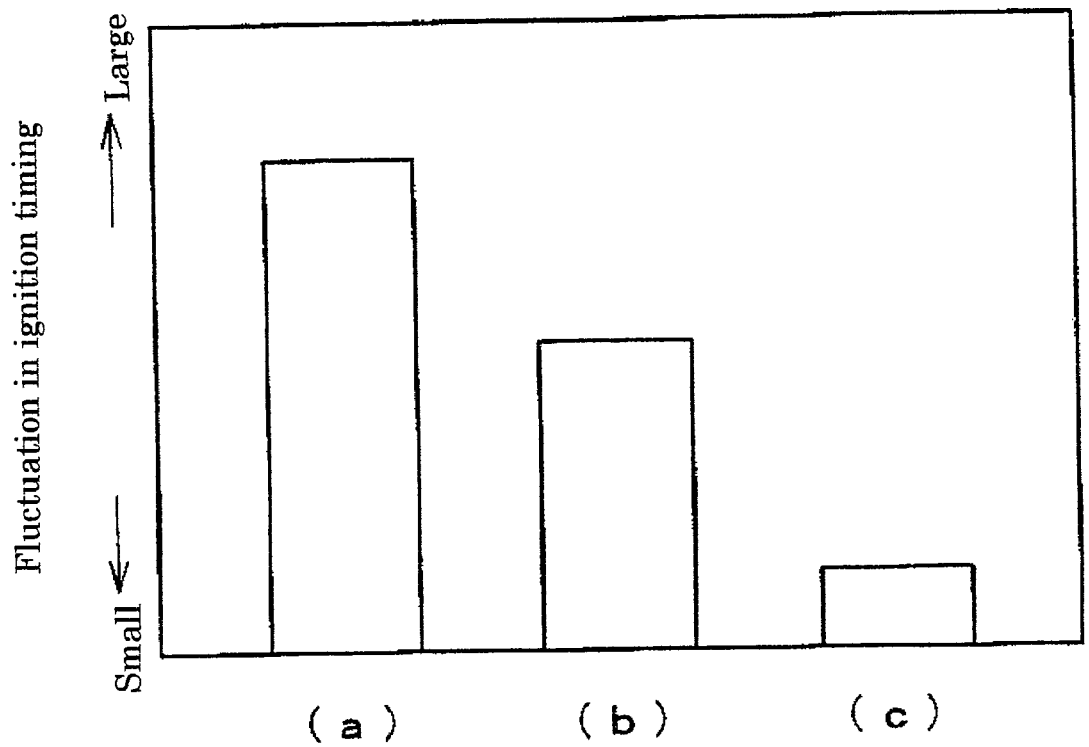
FIG. 23 is a graph showing the fluctuation in compression ignition timing among the cylinders in the same conditions (a), (b), and (c) as those of FIG. 22.
Figure 24:
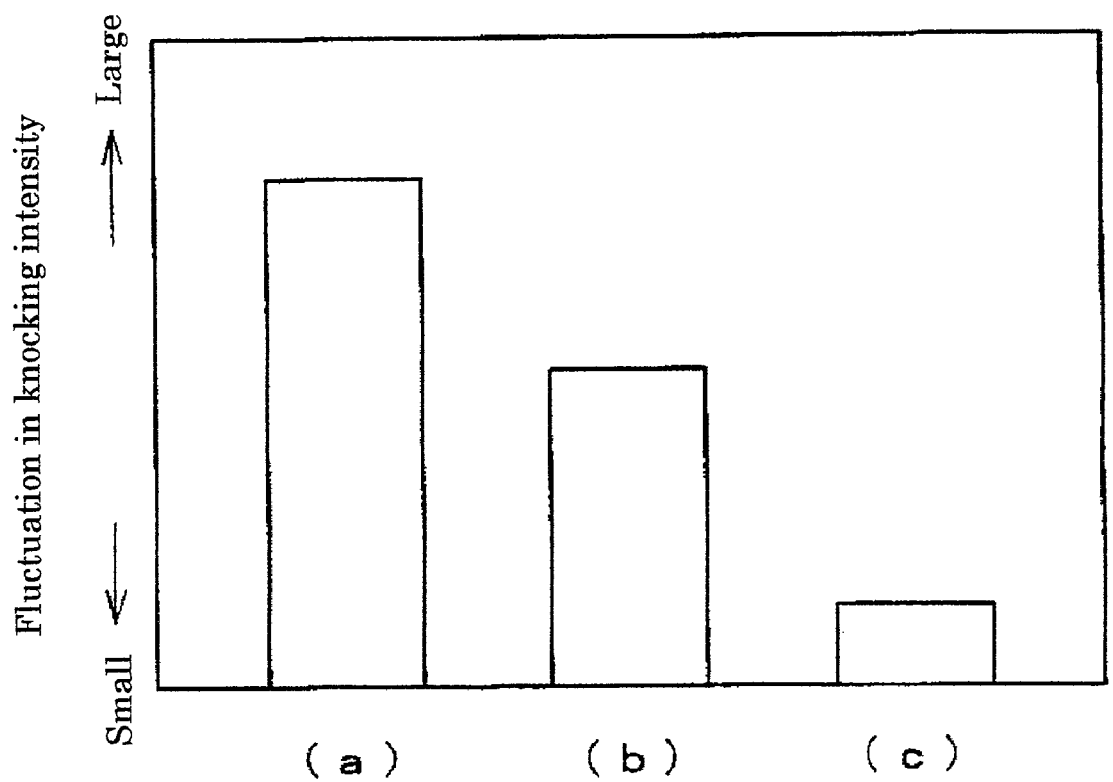
FIG. 24 is a graph showing a fluctuation in knocking intensity among the cylinders in the same conditions (a), (b), and (c) as those of FIG. 22.

FIGS. 22 to 24 are graphs showing the comparisons of the fluctuations of various combustion parameters among the cylinders in the case (a) where the spark ignition is not performed, in the case (b) where the spark ignition is supplementarily performed only to a particular cylinder in which the compression ignition is not performed by the operating method 1, and in the case (c) where the spark ignition is supplementarily performed to all the cylinders by the operating method 4 in order to time the compression ignition. Specifically, FIG. 22 shows the fluctuation in in-cylinder maximum pressure (difference between a maximum value and a minimum value) among the cylinders, FIG. 23 shows the fluctuation in compression ignition timing among the cylinders, and FIG. 24 shows the fluctuation in knocking intensity (ease of knocking) among the cylinders.

In the case (a), it is found that the fluctuation among the cylinders becomes extremely large in any combustion parameter. This is attributed to the fact that the cylinder in which the compression ignition cannot be performed (misfire is generated) exists or the compression ignition timing is not controlled at all. On the other hand, in the case (b), because the compression ignition is performed in all the cylinders, the fluctuation becomes small in each combustion parameter compared with the case (a). In the case (c), because the compression ignition is timed in all the cylinders, the fluctuation is restrained to a small level in each combustion parameter.

Figure 25:
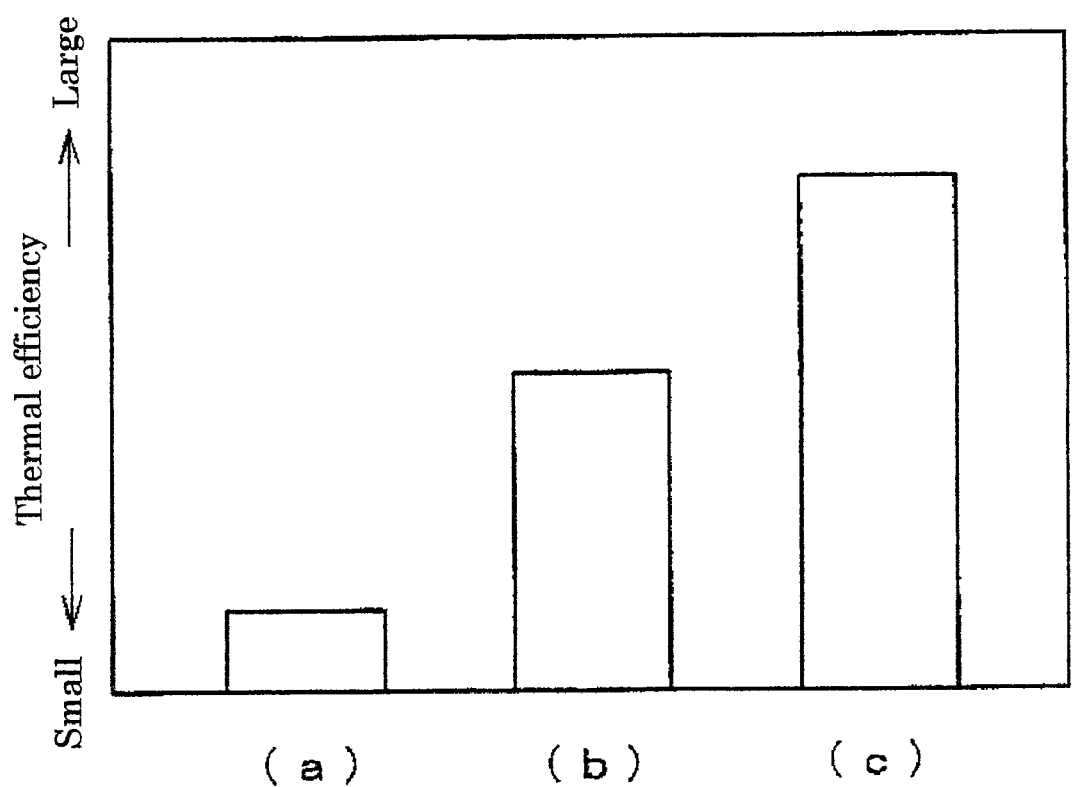
FIG. 25 is a graph comparatively showing thermal efficiency in the same conditions (a), (b), and (c) as those of FIG. 22.

FIG. 25 is a graph showing the comparison of the thermal efficiency in the same conditions. In the case (a), the thermal efficiency is extremely lowered. In the cases (b) and (c), the fluctuation is restrained to a small level in each combustion parameter as described above, thereby enhancing the thermal efficiency. Particularly, in the case (c), the thermal efficiency is significantly enhanced compared with the case (a).

Figure 26:
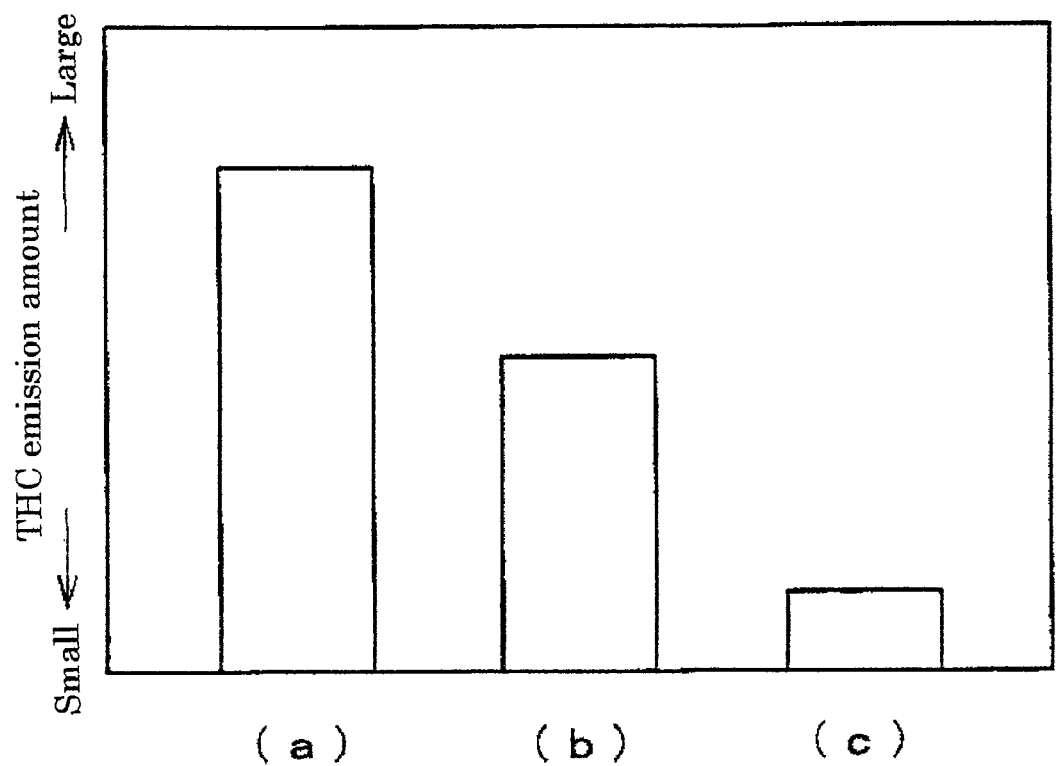
FIG. 26 is a graph comparatively showing an emission amount of unburned hydrocarbon (THC) in the same conditions (a), (b), and (c) as those of FIG. 22.
Figure 27:
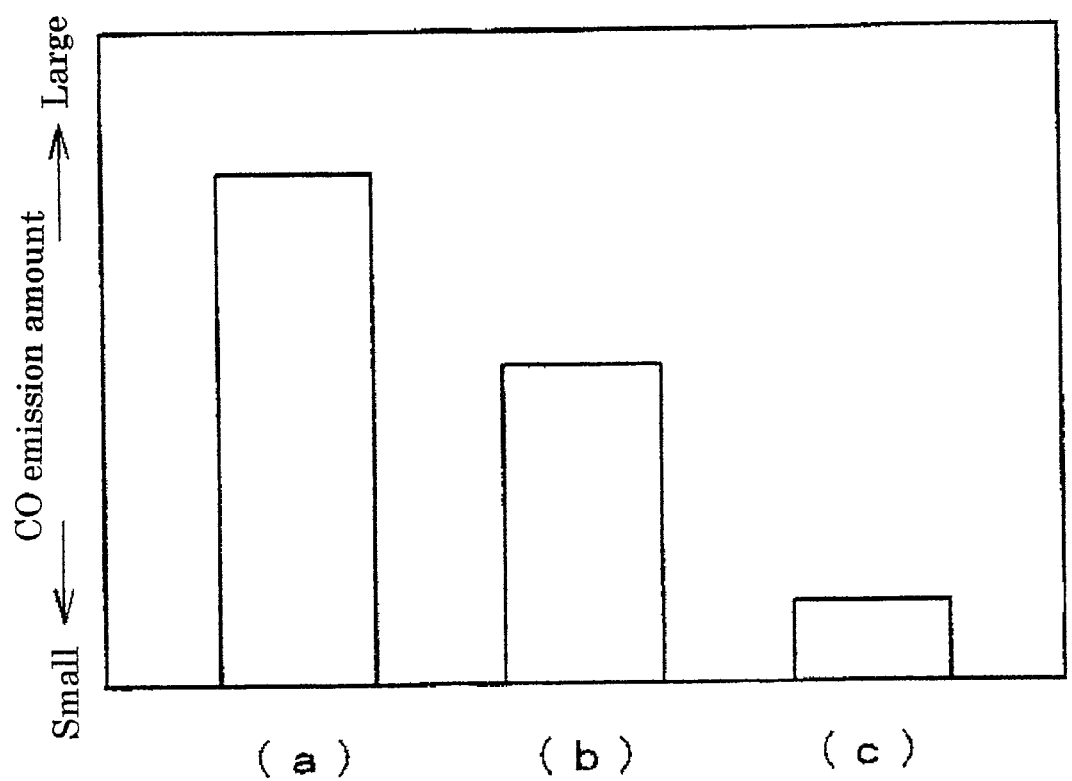
FIG. 27 is a graph comparatively showing an emission amount of carbon monoxide (CO) in the same conditions (a), (b), and (c) as those of FIG. 22.

FIG. 26 is a graph comparatively showing the emission amount of unburned hydrocarbon (THC) in the same conditions (a), (b), and (c), and FIG. 27 is a graph comparatively showing the emission amount of carbon monoxide (CO) in the same conditions (a), (b), and (c). For the emission amount of the air-pollution substance, the emission amount is largely increased in the case (a). However, in the cases (b) and (c), the fluctuation is restrained to a small level in each combustion parameter, so that the emission amount can be restrained. Particularly, in the case (c), it is found that the emission amount of air-pollution substance is extremely restrained compared with the case (a).

The invention is not limited to the embodiment, but the design can appropriately be changed. For example, although the four-cylinder homogeneous charge compressed ignition engine is illustrated in the embodiment, the number of cylinders is not particularly limited.

The invention claimed is:

1. A homogeneous charge compressed ignition engine operating method in which a mixture gas is burned by compression ignition in a combustion chamber of a cylinder, fuel and air being previously mixed to produce the mixture gas,
    wherein the homogeneous charge compressed ignition engine includes a spark ignition device which performs spark ignition to the mixture gas,
    an advance-angle limit and a delay-angle limit of spark ignition timing are set, the compression ignition of the mixture gas being able to be induced at the spark ignition timing, and
    the spark ignition is supplementarily performed to the mixture gas according to an operating condition between the advance-angle limit and the delay-angle limit.

2. The homogeneous charge compressed ignition engine operating method according to claim 1, wherein the engine includes a plurality of cylinders, and
    the spark ignition is performed in a predetermined cylinder such that the compression ignition is timed in each cylinder.

3. The homogeneous charge compressed ignition engine operating method according to claim 2, wherein compression ignition timing which becomes a target is set to compare the target compression ignition timing and actual compression ignition timing, and
    the spark ignition is performed based on the comparison such that the actual compression ignition timing is matched with the target compression ignition timing.

4. The homogeneous charge compressed ignition engine operating method according to claim 1, wherein a time the spark ignition is performed is adjusted such that the compression ignition timing of the mixture gas is adjusted.

5. The homogeneous charge compressed ignition engine operating method according to claim 4, wherein compression ignition timing which becomes a target is set to compare the target compression ignition timing and actual compression ignition timing, and
    a time the spark ignition is performed is adjusted based on the comparison such that the actual compression ignition timing is matched with the target compression ignition timing.

6. The homogeneous charge compressed ignition engine operating method according to claim 4, wherein compression ignition timing which becomes a target is set to compare the target compression ignition timing and actual compression ignition timing,
    a time the spark ignition is performed is adjusted between the advance-angle limit and the delay-angle limit based on the comparison such that the actual compression ignition timing is matched with the target compression ignition timing, and
    an intake air temperature of the mixture gas is adjusted within a range where the actual compression ignition timing can be matched with the target compression ignition timing.

7. The homogeneous charge compressed ignition engine operating method according to claim 4, wherein compression ignition timing which becomes a target is set,
    optimum spark ignition timing is set in the pieces of spark ignition timing which achieve the target compression ignition timing,
    the target compression ignition timing and the actual compression ignition timing are compared,
    a time the spark ignition is performed is adjusted based on the comparison such that the actual compression ignition timing is matched with the target compression ignition timing, and
    an intake air temperature is adjusted such that the spark ignition timing is matched with the optimum spark ignition timing.

8. The homogeneous charge compressed ignition engine operating method according to claim 4, wherein compression ignition timing which becomes a target is set to compare the target compression ignition timing and actual compression ignition timing, and
    a time the spark ignition is performed is adjusted based on the comparison such that the actual compression ignition timing is matched with the target compression ignition timing.

9. The homogeneous charge compressed ignition engine operating method according to claim 1, wherein the engine includes a plurality of cylinders, and
    a time the spark ignition is performed is adjusted in each cylinder such that the compression ignition is timed in each cylinder.

10. The homogeneous charge compressed ignition engine operating method according to claim 9, wherein compression ignition timing which becomes a target is set in each cylinder to compare the target compression ignition timing and actual compression ignition timing,
    a time the spark ignition is performed is adjusted in each cylinder between the advance-angle limit and the delay-angle limit based on the comparison such that the actual compression ignition timing is matched with the target compression ignition timing, and an intake air temperature of the mixture gas is adjusted within a range where the actual compression ignition timing can be matched with the target compression ignition timing in all the cylinders.

11. The homogeneous charge compressed ignition engine operating method according to claim 10, wherein an amount of fuel supplied to the cylinder in which the spark ignition timing becomes the advance-angle limit is increased relative to other cylinders, and
an amount of fuel supplied to the cylinder in which the spark ignition timing becomes the delay-angle limit is decreased relative to other cylinders.

12. The homogeneous charge compressed ignition engine operating method according to claim 10, wherein an effective compression ratio of the cylinder in which the spark ignition timing becomes the advance-angle limit is increased relative to other cylinders, and
an effective compression ratio of the cylinder in which the spark ignition timing becomes the delay-angle limit is decreased relative to other cylinders.

13. The homogeneous charge compressed ignition engine operating method according to claim 10, wherein the engine includes EGR means for refluxing the exhaust gas into the cylinder,
an EGR amount for the cylinder in which the spark ignition timing becomes the advance-angle limit is increased relative to other cylinders, and
an EGR amount for the cylinder in which the spark ignition timing becomes the delay-angle limit is decreased or eliminated relative to other cylinders.

14. The homogeneous charge compressed ignition engine operating method according to claim 10, wherein an intake air temperature in the cylinder in which the spark ignition timing becomes the advance-angle limit is increased relative to other cylinders, and
an intake air temperature in the cylinder in which the spark ignition timing becomes the delay-angle limit is decreased relative to other cylinders.

15. The homogeneous charge compressed ignition engine operating method according to claim 10, wherein a temperature of the cylinder in which the spark ignition timing becomes the advance-angle limit is increased relative to other cylinders, and
a temperature of the cylinder in which the spark ignition timing becomes the delay-angle limit is decreased relative to other cylinders.

16. The homogeneous charge compressed ignition engine operating method according to claim 10, wherein a component of the cylinder in which the spark ignition timing becomes the advance-angle limit is made of a material having a heat conductivity lower than those of other cylinders, and
a component of the cylinder in which the spark ignition timing becomes the delay-angle limit is made of a material having a heat conductivity higher than those of other cylinders.

17. The homogeneous charge compressed ignition engine operating method according to claim 9, wherein compression ignition timing which becomes a target is set in each cylinder,
optimum spark ignition timing is set in the pieces of spark ignition timing which achieve the target compression ignition timing in each cylinder,
the target compression ignition timing and the actual compression ignition timing are compared in each cylinder,
a time the spark ignition is performed is adjusted in each cylinder based on the comparison such that the actual compression ignition timing is matched with the target compression ignition timing, and an intake air temperature is adjusted such that the spark ignition is performed with at the optimum spark ignition timing to the cylinder having the latest spark ignition timing.

18. The homogeneous charge compressed ignition engine operating method according to claim 9, wherein compression ignition timing which becomes a target is set in each cylinder to compare the target compression ignition timing and the actual compression ignition timing,
a time the spark ignition is performed is adjusted in each cylinder based on the comparison such that the actual compression ignition timing is matched with the target compression ignition timing, and
an intake air temperature is adjusted such that a normal operation is performed in the cylinder having the latest spark ignition timing.

19. The homogeneous charge compressed ignition engine operating method according to claim 9, wherein compression ignition timing which becomes a target is set to compare the target compression ignition timing and actual compression ignition timing, and
a time the spark ignition is performed is adjusted based on the comparison such that the actual compression ignition timing is matched with the target compression ignition timing.

20. The homogeneous charge compressed ignition engine operating method according to claim 1, wherein compression ignition timing which becomes a target is set to compare the target compression ignition timing and actual compression ignition timing, and
the spark ignition is performed based on the comparison such that the actual compression ignition timing is matched with the target compression ignition timing.

21. The homogeneous charge compressed ignition engine operating method according to claim 1, wherein an air excess ratio of the mixture gas is detected, and
the advance-angle limit is changed according to the air excess ratio.

22. The homogeneous charge compressed ignition engine operating method according to claim 21, wherein an intake air temperature of the mixture gas is detected, and
the advance-angle limit is changed according to the intake air temperature.

23. The homogeneous charge compressed ignition engine operating method according to claim 21, wherein the engine includes a plurality of cylinders,
an intake air temperature of the mixture gas is detected in each cylinder, and
the advance-angle limit is changed in each cylinder according to each intake air temperature.

24. The homogeneous charge compressed ignition engine operating method according to claim 1, wherein the engine includes a plurality of cylinders,
an air excess ratio of the mixture gas is detected in each cylinder, and
the advance-angle limit is changed in each cylinder according to each air excess ratio.

25. The homogeneous charge compressed ignition engine operating method according to claim 24, wherein an intake air temperature of the mixture gas is detected, and
the advance-angle limit is changed according to the intake air temperature.

26. The homogeneous charge compressed ignition engine operating method according to claim 24, wherein the engine includes a plurality of cylinders, an intake air temperature of the mixture gas is detected in each cylinder, and the advance-angle limit is changed in each cylinder according to each intake air temperature.

27. The homogeneous charge compressed ignition engine operating method according to claim 1, wherein an intake air temperature of the mixture gas is detected, and the advance-angle limit is changed according to the intake air temperature.

28. The homogeneous charge compressed ignition engine operating method according to claim 1, wherein the engine includes a plurality of cylinders, an intake air temperature of the mixture gas is detected in each cylinder, and the advance-angle limit is changed in each cylinder according to each intake air temperature.

* * * * *